United States Patent
Jung et al.

(10) Patent No.: US 10,095,384 B2
(45) Date of Patent: Oct. 9, 2018

(54) METHOD OF RECEIVING USER INPUT BY DETECTING MOVEMENT OF USER AND APPARATUS THEREFOR

(71) Applicant: Samsung Electronics Co., Ltd., Suwon-si, Gyeonggi-do (KR)

(72) Inventors: Dong-uk Jung, Seoul (KR); Hyun-jin Ahn, Yongin-si (KR); Ki-beom Kim, Seoul (KR); Ji-yeon Ma, Seoul (KR); Jae-seok Yoon, Hanam-si (KR); Geul-ji Jung, Seoul (KR); Hyeon-bin Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 43 days.

(21) Appl. No.: 14/980,573

(22) Filed: Dec. 28, 2015

(65) Prior Publication Data
US 2016/0188021 A1  Jun. 30, 2016

(30) Foreign Application Priority Data

Dec. 24, 2014  (KR) ........................ 10-2014-0188998

(51) Int. Cl.
*G06F 3/033* (2013.01)
*G06F 3/0482* (2013.01)
(Continued)

(52) U.S. Cl.
CPC .......... *G06F 3/0482* (2013.01); *G06F 1/1684* (2013.01); *G06F 3/012* (2013.01);
(Continued)

(58) Field of Classification Search
CPC .... G06F 3/03547; G06F 3/0482; G06F 3/017; G06F 3/011
See application file for complete search history.

(56) References Cited

U.S. PATENT DOCUMENTS 7,256,773 B2    8/2007  Kolmykov-Zotov et al.
2009/0322695 A1*  12/2009  Cho ...................... G06F 3/0416
                                                            345/173
(Continued)

OTHER PUBLICATIONS

John Paulin Hansen et al., "Command Without a Click: Dwell Time Typing by Mouse and Gaze Selections", The IT University of Copenhagen, Glentevej 67, 2400 Copenhagen, Denmark, Tokyo Institute of Technology, 2-12-1 Oh-okayama Meguro-ku,Tokyo 152-8552 Japan, IFIP, 2003, pp. 121-128.
(Continued)

*Primary Examiner* — Towfiq Elahi
(74) *Attorney, Agent, or Firm* — Jefferson IP Law, LLP

(57) ABSTRACT

A device including a display such as a touch screen is provided. The device includes a communication unit configured to obtain movement information of a user, a display unit configured to move a cursor displayed on the display or touch screen in accordance with the movement information of the user, and a controller configured to determine coordinates where the cursor and/or moved cursor is located as dwell start coordinates and determine the dwell start coordinates as touch coordinates when the cursor is located within a reference distance from the dwell start coordinates during an entire reference time starting from a point in time when the cursor is moved to the dwell start coordinates.

20 Claims, 34 Drawing Sheets

(51) Int. Cl.
G06F 3/041 (2006.01)
G06F 1/16 (2006.01)
G06F 3/01 (2006.01)
G06F 3/0354 (2013.01)

(52) U.S. Cl.
CPC .......... *G06F 3/013* (2013.01); *G06F 3/03549* (2013.01); *G06F 3/0416* (2013.01)

(56) References Cited

U.S. PATENT DOCUMENTS

2015/0326909 A1* 11/2015 Eun .................... H04N 21/4126 725/38
2016/0048223 A1* 2/2016 Taguchi .................. G06F 3/013 345/157

OTHER PUBLICATIONS

Tyler Simpson et al., "Tooth-Click Control of a Hands-Free Computer Interface", IEEE Transactions on Biomedical Engineering, vol. 55, No. 8, Aug. 2008, pp. 2050-2056.
Lisa Anthony et al., "Analyzing User-Generated YouTube Videos to Understand Touchscreen Use by People with Motor Impairments", UMBC Information Systems 1000 Hilltop Circle, Baltimore MD 21250 USA and College of Information Studies, University of Maryland, College Park MD 20742 USA, CHI 2013, Apr. 27-May 2, 2013, pp. 1-10.
Jacob O. Wobbrock et al., "Trackball Text Entry for People with Motor Impairments", Human-Computer Interaction Institute, School of Computer Science, Carnegie Mellon University, pp. 479-488.
Jacob O. Wobbrock et al., "Writing with a Joystick: A Comparison of Date Stamp, Selection Keyboard, and EdgeWrite", Human-Computer Interaction Institute, School of Computer Science, Carnegie Mellon University, pp. 1-9.
Jacob O. Wobbrock et al., "EdgeWrite: A Stylus-Based Text Entry Method Designed for High Accuracy and Stability of Motion", Human Computer Interaction Institute School of Computer Science, Carnegie Mellon University, 5000 Forbes Avenue, Pittsburgh, PA 15213 USA, pp. 61-70.
Jacob O. Wobbrock et al., "Text Entry from Power Wheelchairs: EdgeWrite for Joysticks and Touchpads", Human-Computer Interaction Institute, School of Computer Science, Carnegie Mellon University, Pittsburgh, PA 15213 USA and A.T. Sciences, Inc., 160 N. Craig Street, Suite 117, Pittsburgh, PA 15213 USA, pp. 110-117.
"Gentle Mouse" Gentle Computing, LLC, 2006, http://www.gentlemouse.com/screenshots.aspx.
"Apponeer" CapSoft, Inc, 2013, http://apponeer.com/.
"Camera Mouse" Trustees of Boston College, 2015, http://www.cameramouse.org.
"Therapy Box" Therapy Box Limited, 2015, http://www.therapy-box.co.uk/default.aspx.
"Tecla", 2015, Komodo OpenLab Inc., c/o Digital Media Zone, 10 Dundas St. E., 6th Floor,Toronto, ON M5B 2G9, http://gettecla.com.
"grapvine Computer Access Solutions" http://www.grapevineat.ie/.
"Point-N-Click", Virtual Mouse by Polital Enterprises, http://www.polital.com/pnc.
Jacob O. Wobbrock, "EdgeWrite Text Entry", The Information School, University of Washington, Mary Gates Hall, Suite 370, Box 352840, Seattle, WA 98195-2840, http://depts.washington.edu/ewrite/.
"LIFEtool", http://www.lifetool.at/home.html?L=1.
"HeadMouse Nano" Wireless Head Controlled Mouse, Origin Instruments Corporation, 854 Greenview Drive, Grand Prairie, Texas, 75050 USA, 2015, http://www.orin.com/access/headmouse.
"Sip and Puff Switch Solutions, Single and Multi-User Offerings", Origin Instruments Corporation, 854 Greenview Drive, Grand Prairie, Texas, 75050 USA, 2015, http://www.orin.com/access/sip_puff/.
"IntegraMouse" LifeACE consortium, LIFEtool Solutions GmbH, Hafenstr. 47-51, 4020 Linz, Austria, http://www.integramouse.com/home-integramouse.html?L=1.

* cited by examiner

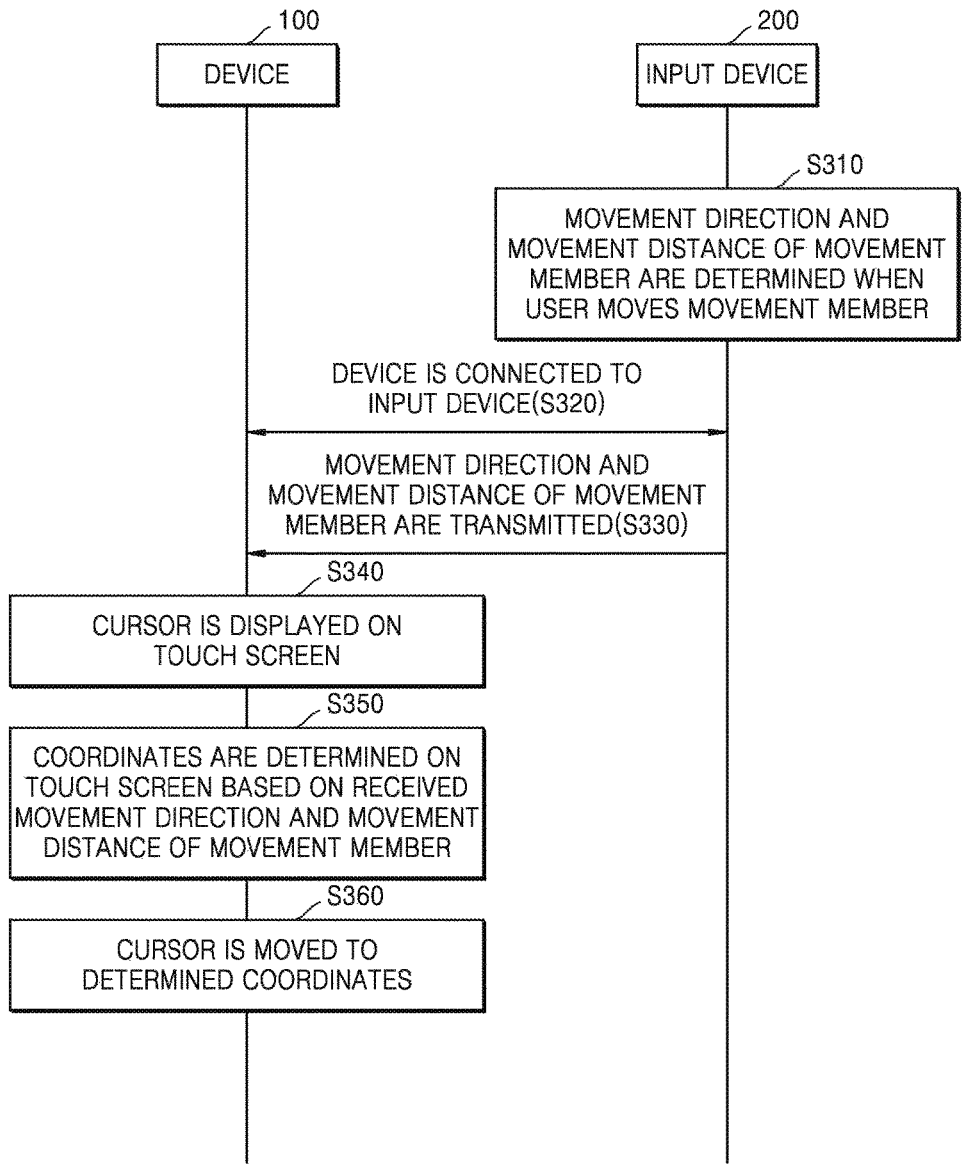

METHOD OF RECEIVING USER INPUT BY DETECTING MOVEMENT OF USER AND APPARATUS THEREFOR

CROSS-REFERENCE TO RELATED APPLICATION(S)

This application claims the benefit under 35 U.S.C. § 119(a) of a Korean patent application filed on Dec. 24, 2014 in the Korean Intellectual Property Office and assigned Serial number 10-2014-0188998, the entire disclosure of which is hereby incorporated by reference.

TECHNICAL FIELD

The present disclosure relates to methods of detecting movements of a user and generating touch events based on the detected movements of the user, and apparatuses therefor.

BACKGROUND

Ordinary devices using a graphic user interface (GUI) may receive user inputs from a pointing input device such as a keyboard or a mouse. That is, a user may select one of objects displayed on a screen by pressing keys on the keyboard or clicking the mouse.

As devices become smaller and more portable, devices that include touch screens rather than additional input devices have come into widespread use. As the devices including the touch screens have become popular, the devices use UIs that are executed based on various touch gestures. For example, the touch gestures may include a swipe gesture for switching screens, a zoom-in or zoom-out gesture for enlarging or reducing a certain object, a drag and drop gesture for moving a certain object, or the like.

However, persons having upper limb disabilities may not be able to easily perform the touch gestures. For example, a person who cannot freely move his/her body due to a spinal cord injury, etc., or a person whose fingers are not strong enough to perform the touch gestures may not be able to accurately perform the touch gestures.

Also, persons having upper limb disabilities may locate a cursor at desired coordinates by using the backs of their hands, feet, chins, tongues, or the like according to the type of disability, but may not be able to select coordinates through, for example, clicking. Also, persons having upper limb disabilities may not be able to simultaneously touch multiple locations.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are provided to address at least the above-mentioned problems and/or disadvantages and to provide at least the advantages described below. Accordingly, an aspect of the present disclosure is to provide methods of detecting movements of a user and generating touch events based on the detected movements of the user.

Additional aspects will be set forth in part in the description which follows and, in part, will be apparent from the description, or may be learned by practice of the presented embodiments.

In accordance with an aspect of the present disclosure, a device including a display such as a touch screen is provided. The device includes a communication unit configured to obtain movement information of a user, a display unit configured to move a cursor displayed on the touch screen in accordance with the movement information, and a controller configured to determine coordinates where the cursor and/or moved cursor is located, determine coordinates where the cursor is located as dwell start coordinates, and to determine the dwell start coordinates as touch coordinates when the cursor is located within a reference distance from the dwell start coordinates during an entire reference time starting from a point in time when the cursor is moved to the dwell start coordinates.

In accordance with another aspect of the present disclosure, a method of receiving a user input is provided. The method includes obtaining, by a device comprising a display such as a touch screen, movement information of a user, moving a cursor displayed on the touch screen in accordance with the obtained movement information of the user, determining coordinates where the cursor and/or moved cursor is located as dwell start coordinates, and determining the dwell start coordinates as touch coordinates when the cursor is located within a reference distance from the dwell start coordinates during an entire reference time starting from a point in time when the cursor is moved to the dwell start coordinates.

Other aspects, advantages, and salient features of the disclosure will become apparent to those skilled in the art from the following detailed description, which, when taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3 is a flowchart of a method of receiving information about a movement of a movement member, by a device, from an input device according to an embodiment of the present disclosure;

Throughout the drawings, it should be noted that like reference numbers are used to depict the same or similar elements, features, and structures.

DETAILED DESCRIPTION

Figure 1:
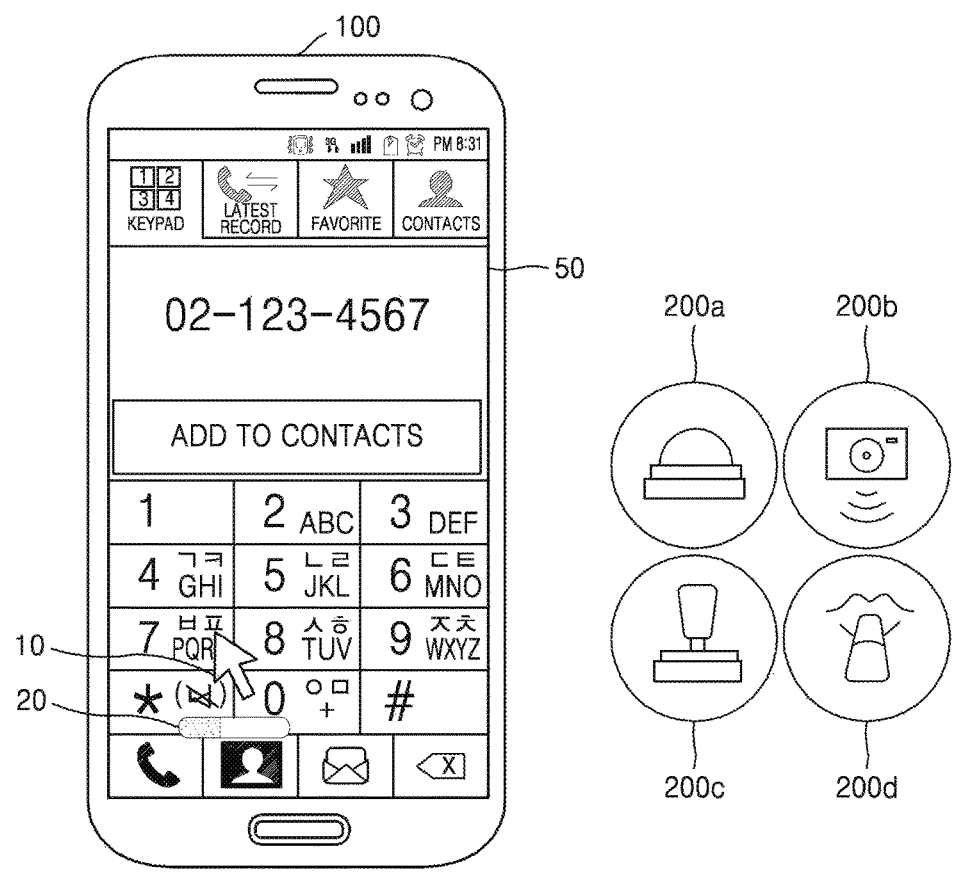
FIG. 1 illustrates a method of generating, by a device, a touch event based on a movement of a user according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a", "an", and "the", include plural referents unless the context clearly dictates otherwise. Thus, for example, reference to "a component surface" includes reference to one or more of such surfaces.

The terms used in the specification will be briefly described, and the present disclosure will be described in detail.

The terms used in this specification are those general terms currently widely used in the art in consideration of functions regarding the present disclosure, but the terms may vary according to the intention of those of ordinary skill in the art, precedents, or new technology in the art. Also, specified terms may be selected by the applicant, and in this case, the detailed meaning thereof will be described in the detailed description of the present disclosure. Thus, the terms used in the specification should be understood not as simple names, but based on the meaning of the terms and the overall description of the present disclosure.

It will be further understood that the terms "comprises" and/or "comprising" used herein specify the presence of stated features or components, but do not preclude the presence or addition of one or more other features or components. Also, the terms " . . . unit", " . . . module", etc. are units for processing at least one function or operation and may be implemented as hardware, software, or a combination of hardware and software.

Throughout the specification, the term "dwell gesture" may denote a gesture for manipulating a cursor whereby the cursor displayed on a screen is moved to a location and stays in the vicinity of the location.

The present disclosure will now be described more fully with reference to the accompanying drawings, in which various embodiments of the present disclosure are shown. The present disclosure may, however, be embodied in many different forms and should not be construed as being limited to the various embodiments set forth herein; rather, these various embodiments are provided so that this disclosure will be thorough and complete, and will fully convey the concept of the present disclosure to those of ordinary skill in the art. In the description of the present disclosure, certain detailed explanations of the related art are omitted when it is deemed that they may unnecessarily obscure the essence of the inventive concept.

FIG. 1 illustrates a method of generating, by a device, a touch event based on a movement of a user according to an embodiment of the present disclosure.

Referring to FIG. 1, a device 100 is shown including a touchscreen 50. Although a user may not touch the touch screen 50, the device 100 may determine coordinates of the user on the touch screen 50 based on information regarding a movement of the user and generate a touch event with regard to the determined coordinates according to embodiments of the present disclosure.

The device 100 may obtain the information regarding the movement of the user. For example, the device 100 may receive the information regarding the movement of the user from an input device connected to the device 100. The input device may include, but is not limited to, a track ball 200a, a head mouse 200b, a joystick 200c, an integra mouse 200d, an eye mouse, a head mouse Extreme™, an enabler Trackball™, an enabler JoyStick™, a mouse mover star Switch™, a roller trackball Plus™, a big Track™, a big Switch™, a mouse Stick™, a clear view head Point™,jowx 2™,and a quick Glancer™. Also, according to various embodiments, the input device may be referred to as an assistant device for the disabled. Also, the input device may not include a button for clicking.

The input device may be separated from the device 100 or may be installed therein. When the input device is separated from the device 100, the device 100 may receive information regarding a movement of the user from the input device.

When the input device is installed in the device 100, the device 100 may detect a movement of the user and generate information regarding the detected movement of the user.

The device 100 may move a cursor 10 displayed on the touch screen 50 in accordance with each piece of information regarding the movement of the user. For example, the input device may periodically, aperiodically or when triggered, measure the movement of the user. Also, the input device may periodically, aperiodically or when triggered, transmit the information regarding the movement of the user to the device 100.

While obtaining the information regarding the movement of the user, the device 100 may determine coordinates on the touch screen 50 in accordance with each piece of the information regarding the movement of the user. As the coordinates are determined, the device 100 may move the cursor 10 to the determined coordinates.

When the cursor 10 is moved to a location where the cursor 10 is to be moved and stays in that vicinity, the device 100 may generate a touch event at the location where the cursor 10 is moved. Accordingly, the user may manipulate the device 100 by moving the cursor 10 with the input device instead of directly touching the touch screen 50. According to various embodiments, an operation for manipulating the cursor 10 to make the cursor 10 stay in the vicinity of the location where the cursor 10 is moved may be referred to as a "dwell gesture".

The touch event may include all touch events generated in the touch screen, for example, a tap event, a touch and hold event, a double tap event, a long tap event, a drag event, a panning event, a flick gesture, a drag and drop event, a swipe and pinch event, or the like. The touch event may be generated when the user directly touches the touch screen or when a proximity event is detected.

For example, "tapping" may describe a user's motion for touching a touch screen by using a finger or an electronic pen and then instantly lifting the finger or electronic pen from the touch screen without moving.

Also, "touching and holding" may describe a user's motion for touching a touch screen by using a finger or an electronic pen and then maintaining the above touching motion over a critical time (e.g., 2 seconds), after touching the touch screen. That is, a time difference between a touch-in time and a touch-out time is greater than or equal to the critical time, for example, 2 seconds. When a touch input lasts more than the critical time, in order to remind the user that the touch input is subject to interpretation as a tapping or as a touching and holding, a feedback signal may be provided in a visual, acoustic, or tactile manner. The critical time may vary according to various embodiments.

Also, "double tapping" may describe a user's motion for touching the touch screen twice by using a finger or an electronic pen.

"Dragging" may describe a user's motion for touching the touch screen by using a finger or an electronic pen and moving the finger or electronic pen to another position on the touch screen while maintaining the touching motion. The dragging motion may enable the moving or panning motion of an object.

"Panning" may describe a user's motion for performing a dragging motion without selecting an object. Since no object is selected in the panning motion, no object is moved in a page but the page itself is moved on the touch screen or a group of objects may be moved within a page.

"Flicking" may describe a user's motion for performing a dragging motion over a critical speed, for example, 100 pixel/s, by using a finger or an electronic pen. The dragging (or panning) motion or the flicking motion may be distinguished based on whether the moving speed of the finger or electronic pen exceeds the critical speed, for example, 100 pixel/s.

"Dragging and Dropping" may describe a user's motion for dragging an object to a predetermined position on the touch screen by using a finger or an electronic pen, and then dropping the object at that position.

"Pinching" may describe a user's motion for moving two fingers touching the touch screen in opposite directions. The "pinching" motion is a gesture to either magnify (e.g., open pinch) or contract (e.g., close pinch) an object or a page. A magnification value or a contraction value may be determined according to a distance between the two fingers. A gesture of moving the two fingers touching the touch screen closer to each other may be referred to as a "zoom-out" motion, and a gesture of moving the two fingers touching the touch screen farther from each other may be referred to as a "zoom-in" motion.

"Swiping" may describe a user's motion for touching an object on the touch screen by using a finger or a touch tool, and simultaneously moving the object horizontally or vertically by a predetermined distance. A swiping motion in a diagonal direction may not be recognized as a swiping event.

Returning to FIG. 1, the device 100 may also display an object indicating an elapsed portion of a reference time starting from a point in time when the cursor 10 is moved. For example, the device 100 may display a progress bar 20 indicating the elapsed time together with the cursor 10.

Figure 2:
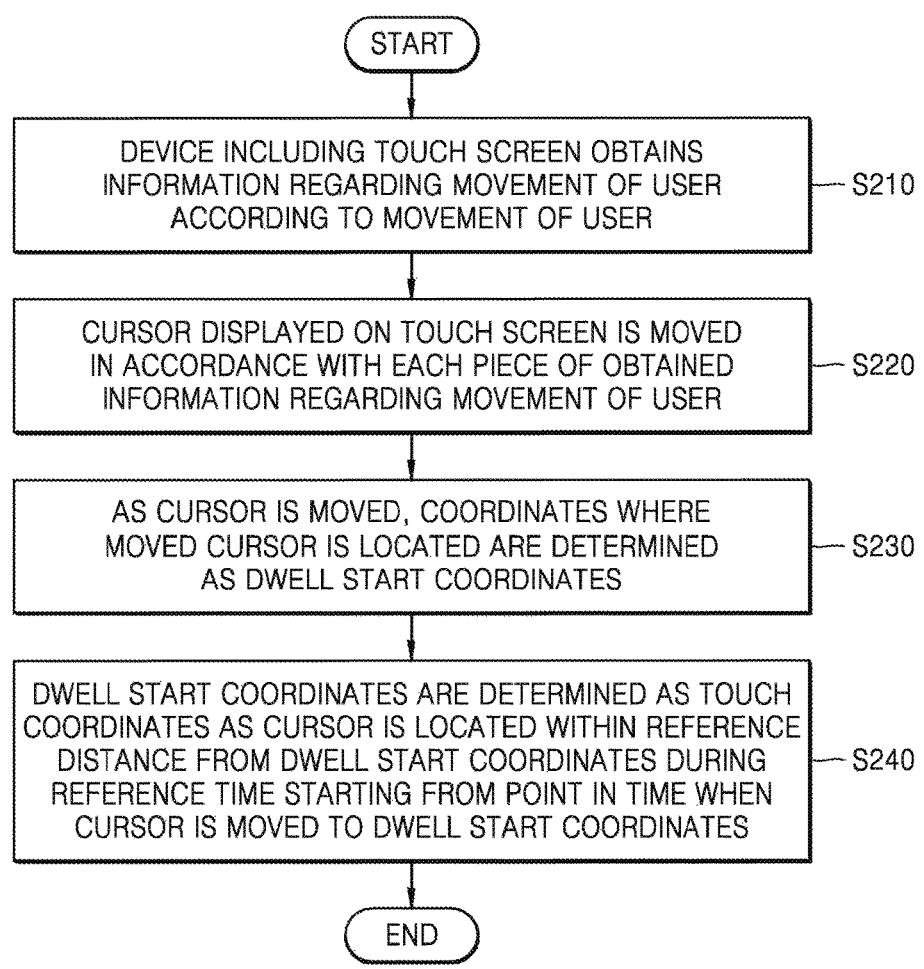
FIG. 2 is a flowchart of a method of generating, by a device, a touch event based on a movement of a user according to an embodiment of the present disclosure.

FIG. 2 is a flowchart of a method of generating, by the device, a touch event based on a movement of the user according to an embodiment of the present disclosure.

Referring to FIG. 2, in operation S210, the device 100 including the touch screen may obtain information regarding the movement of the user according to the movement of the user.

The device 100 may receive the information regarding the movement of the user from an input device connected to the device 100. For example, the input device may include a sensor or sensors for detecting a movement of a movement member.

The movement member may vary according to input devices. For example, when the input device is a track ball device, the movement member may be a ball in the track ball device. When the user moves the movement member, the input device may measure the movement of the movement member. Also, the input device may transmit information regarding the movement of the movement member to the device 100.

The input device may periodically, aperiodically or when triggered, transmit the information regarding the movement of the movement member to the device 100. Also, the input device may transmit the information regarding the movement of the movement member to the device 100 only when the movement member is moved.

The information regarding the movement of the movement member may include a movement speed, a movement direction and/or a movement distance of the movement member. The movement direction and movement distance of the movement member may be transmitted in a form of X and Y coordinates, but embodiments are not limited thereto.

The device 100 may be connected to the input device in a wired or wireless manner. When the device 100 receives the information regarding the movement of the movement member from the input device, the device 100 may display the cursor on the touch screen.

According to various embodiments, the device 100 includes a sensor and may detect a movement of the user by using the sensor. For example, the device 100 may capture an image of an eye or eyes of the user by using a camera included in the device 100, detect locations of the eyes from the captured image, and detect a movement direction and movement distance of the eyes by tracking the detected locations of the eyes.

In operation S220, the device 100 may move the cursor displayed on the touch screen in accordance with each piece of information regarding the movement of the user.

The device 100 may determine a location of the cursor on the touch screen in accordance with the information regarding the movement of the user. For example, the device 100 may determine coordinates where the cursor is to be moved, based on the movement speed, movement direction and/or movement distance of the movement member that are received from the input device.

The relation between the movement distance of the movement member and the cursor on the touch screen may be determined or predetermined by the device 100. For example, the number of pixels in the touch screen per unit movement distance of the movement member may be predetermined by the device 100. Accordingly, the device 100 may determine the coordinates where the cursor is to be moved based on current coordinates of the cursor and the movement speed, movement direction and/or movement distance of the movement member that are received from the input device.

According to various embodiments, when the device 100 detects the movement of the user by using the sensor included in the device 100, the coordinates where the cursor is to be moved may be determined based on the movement speed, movement direction and/or movement direction of the user.

As the coordinates where the cursor is to be moved are determined, the device 100 may move the cursor to the determined coordinates.

In operation S230, as the cursor is moved, the device 100 may determine the coordinates where the moved cursor is located as dwell start coordinates.

The dwell start coordinates may be coordinates whose distance from previous coordinates is greater than a reference distance, from among coordinates of the cursor. As the coordinates where the cursor is to be moved are determined, the device 100 may determine whether a distance from the coordinates where the cursor is to be moved to current coordinates of the cursor is beyond the reference distance. When the coordinates where the cursor is to be moved are beyond the reference distance, the device 100 may determine the coordinates where the cursor is to be moved as the dwell start coordinates.

In operation S240, if the cursor is located within the reference distance from the dwell start coordinates during an entire reference time starting from a point in time when the cursor is moved to the dwell start coordinates, the device 100 may determine the dwell start coordinates as touch coordinates.

The reference time may be a time when the cursor has to be located within the reference distance from the dwell start coordinates so as to determine the dwell start coordinates as the touch coordinates. According to various embodiments, the reference time may be referred to as a dwell time.

The device 100 may determine coordinates of the cursor based on the information regarding the movement of the movement member that is received from the input device during the reference time starting from the point in time when the cursor is moved to the dwell start coordinates and may move the cursor to the determined coordinates.

In this case, the device 100 may determine whether the cursor is located within the reference distance from the dwell start coordinates during the reference time starting from the point in time when the cursor is moved to the dwell start coordinates.

When the cursor is located within the reference distance from the dwell start coordinates during the entire reference time starting from the point in time when the cursor is moved to the dwell start coordinates, the device 100 may determine the dwell start coordinates as the touch coordinates. When the dwell start coordinates are determined as the touch coordinates, the device 100 may generate a touch event at the touch coordinates. In this case, the touch event may be a touch event selected by a user from among touch events.

Also, the device 100 may display an object on the touch screen indicating an elapsed portion of the reference time from the point in time when the cursor is moved to the dwell start coordinates.

Also, when the cursor is moved beyond the reference distance from the dwell start coordinates within the reference time starting from the point in time when the cursor is moved to the dwell start coordinates, coordinates of the cursor that are beyond the reference distance may be re-determined as dwell start coordinates.

The reference distance may be predetermined by the user of the device 100. For example, the device 100 may provide a user interface (UI) for setting the reference distance based on a movement of the user. When a menu for setting the reference distance is selected, the device 100 may display a figure having a predetermined size on the touch screen. When the device 100 receives a user input for manipulating a movement member to locate the cursor within the figure, the device 100 may set the reference distance based on whether the cursor is located within the figure during the entire reference time.

Also, when the cursor is located within a predetermined region on the touch screen, the device 100 may display a menu for selecting one of the items on an area including the predetermined region.

Also, the touch screen may include a non-active area where a touch event is not generated, even though the touch coordinates are included in the non-active area.

Also, when the device 100 obtains the information regarding the movement of the movement member, the device 100 may transmit, to a neighboring device, the information regarding the movement of the movement member that is obtained via short distance communication.

FIG. 3 is a flowchart of a method of receiving information about a movement of the movement member by the device from an input device according to an embodiment of the present disclosure.

Referring to FIG. 3, in operation S310, when the user moves the movement member, an input device 200 may determine a movement speed, movement direction and/or a movement distance of the movement member.

The input device 200 may include a sensor or sensors for measuring a movement of the movement member. The movement member may be a member for receiving a user input by moving or rotating. The movement member may be included in the input device 200. For example, in the case of a track ball device, the movement member may be a ball in the track ball device. Also, the movement member may be located outside of the input device 200. For example, in the case of a head mouse, the movement member may be a sticker attached to a body part of the user.

As the user moves the movement member, the input device 200 may determine the movement speed, movement direction and/or movement distance of the movement member.

In operation S320, the device 100 may be connected to the input device 200.

The device 100 may be connected to the input device 200 in a wired or wireless manner. For example, the device 100 may be connected to the input device 200 via a universal serial bus (USB) cable. In this case, when the device 100 or the input device 200 does not include a terminal to be connected to the USB cable, the device 100 or the input device 200 is connected to an on-the-go (OTG) cable connected to the USB cable, and thus, the device 100 may be connected to the input device 200.

Also, for example, the device 100 may be connected to the input device 200 via short distance wireless communication such as Bluetooth.

According to various embodiments, when the device 100 is connected to the input device 200, the device 100 may receive identification information of the input device 200 from the input device 200.

In operation S330, the input device 200 may transmit the movement speed, movement direction and/or movement distance of the movement member to the device 100.

As the user moves the movement member, the input device 200 may transmit the movement speed, movement direction and/or movement distance of the movement member to the device 100. In this case, the movement direction and the movement distance may be transmitted in a form of X and Y coordinates, but embodiments are not limited thereto.

In operation S340, the device 100 may display the cursor on the touch screen.

In general, since the device 100 including the touch screen does not receive a user input from an additional input device, the device 100 may not display the cursor on the touch screen.

When the device 100 receives the movement speed, movement direction and/or movement distance of the movement member from the input device 200, the device 100 may display the cursor on the touch screen. Also, according to various embodiments, when the device 100 receives the identification information of the input device 200 from the input device 200, the device 100 may display the cursor on the touch screen.

In operation S350, the device 100 may determine coordinates on the touch screen based on the received movement speed, movement direction and/or movement distance of the movement member.

The relation between the movement distance of the movement member and the cursor on the touch screen may be determined or predetermined by the device 100. For example, the number of pixels on the touch screen per unit movement distance of the movement member may be predetermined by the device 100. Accordingly, the device 100 may determine coordinates where the cursor is to be moved, based on current coordinates of the cursor, the movement speed, the movement direction, and/or the movement distance of the movement member.

In operation S360, the device 100 may move the cursor to the determined coordinates.

Figure 4A:
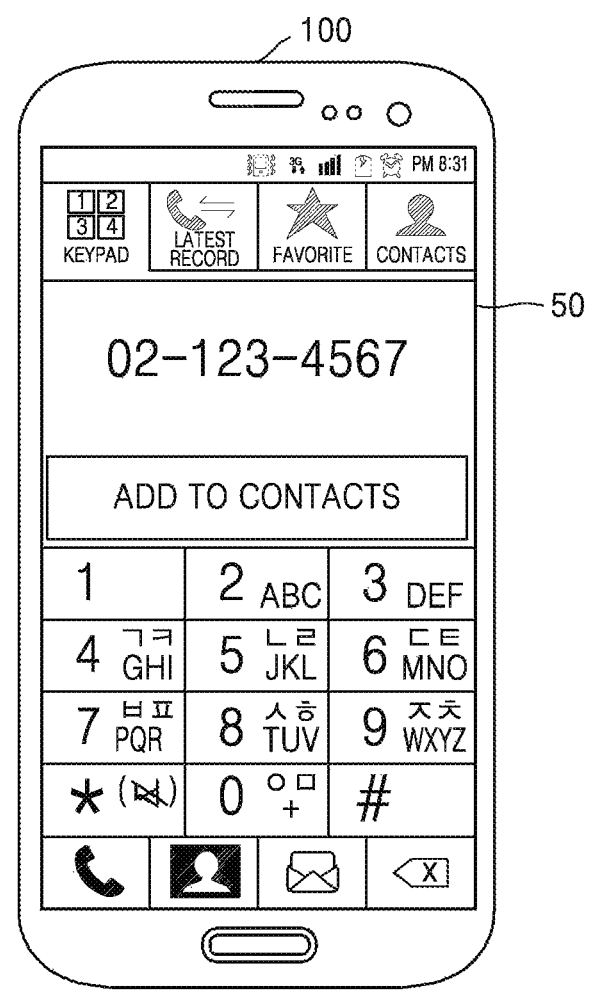
FIGS. 4A to 4C illustrate a method of receiving information about a movement of a movement member, by a device, from an input device according to various embodiments of the present disclosure.
Figure 4B:
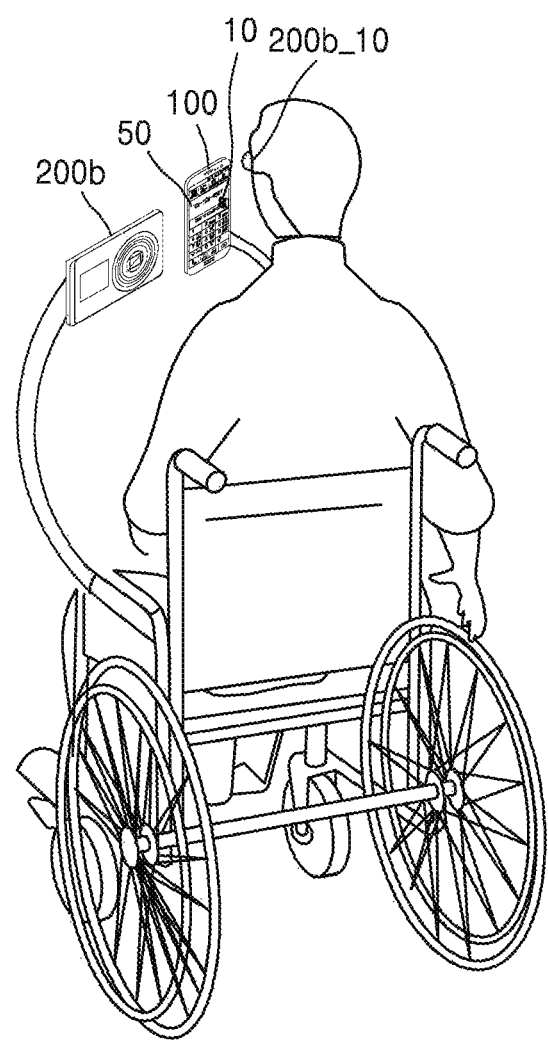
Figure 4C:
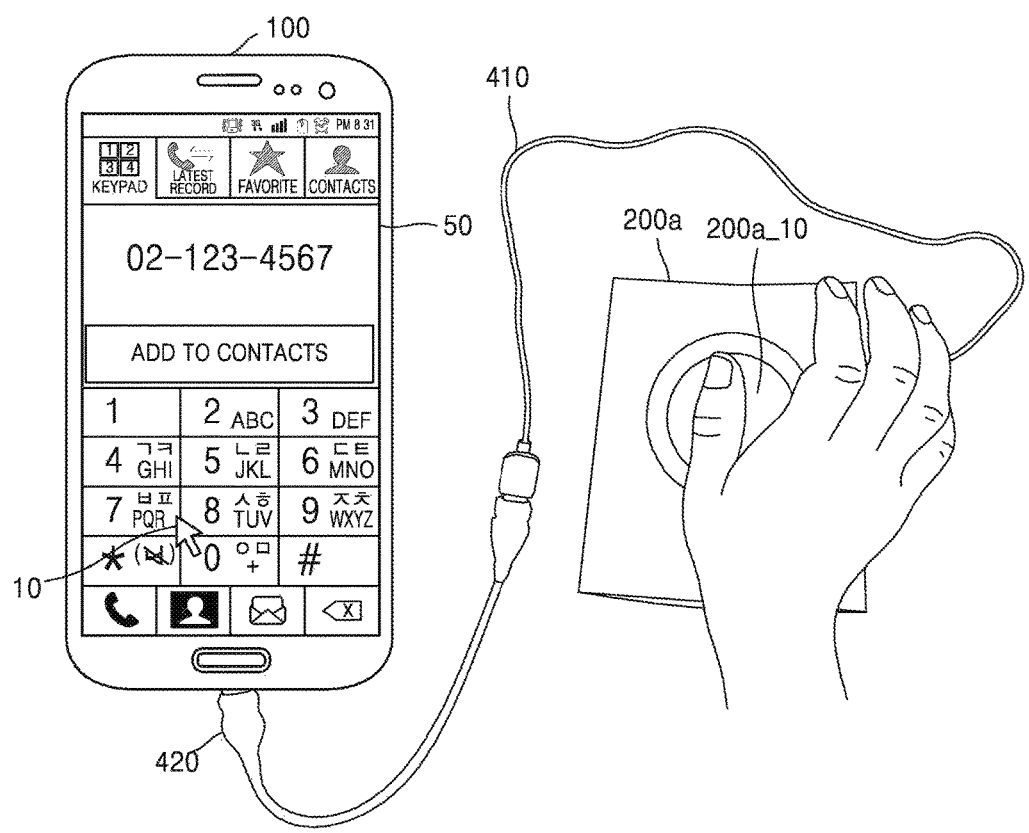

FIGS. 4A to 4C illustrate a method of receiving information about a movement of the movement member by the device from the input device according to various embodiments of the present disclosure.

Referring to FIG. 4A, a UI for selecting a phone number may be displayed on the touch screen 50 of the device 100. In this case, the device 100 may not display the cursor 10 on the touch screen 50.

Referring to FIG. 4B, the device 100 may be installed in a device holder included in a wheelchair of the user. The input device 200 may be installed in an input device holder that is also included in the wheelchair of the user.

The input device 200 may be the head mouse 200*b*. The head mouse 200*b* may be a device for detecting a location of a sticker 200*b*_10 attached to a body part of the user by using an infrared sensor. When the user attaches the sticker 200*b*_10 on their forehead for example, and moves their head, the head mouse 200*b* may measure a movement speed, a movement direction and/or a movement distance of the sticker 200*b*_10.

The device 100 may be connected to the head mouse 200*b*. For example, the device 100 may be connected to the head mouse 200*b* via Bluetooth communication. When the device 100 is connected to the head mouse 200*b*, the device 100 may display the cursor 10 on the touch screen 50.

Also, when connected to the head mouse 200*b*, the device 100 may receive, from the head mouse 200*b*, data regarding the movement speed, the movement direction and/or the movement distance of the sticker 200*b*_10 as data regarding the movement speed, movement direction and/or a movement distance of the head of the user.

When the device 100 receives the movement speed, movement direction and/or the movement distance of the sticker 200*b*_10 from the head mouse 200*b*, the device 100 may determine coordinates where the cursor 10 is to be moved, based on the received movement speed, movement direction and/or movement distance of the sticker 200*b*_10.

Once the coordinates where the cursor 10 is to be moved are determined, the device 100 may move the cursor 10 to the determined coordinates. When the coordinates of the moved cursor 10 are beyond a reference distance with respect to previous coordinates, the device 100 may determine coordinates of the moved cursor 10 as dwell start coordinates. If the coordinates of the moved cursor 10 are not beyond the reference distance from the dwell start coordinates during an entire reference time starting from a point in time when the cursor 10 is moved to the dwell start coordinates, the device 100 may determine the dwell start coordinates as touch coordinates, and may generate a touch event at the touch coordinates.

Accordingly, the user may select a desired number or other icon from among numbers and icons displayed on the touch screen 50 by moving their head.

Referring to FIG. 4C, the input device may be the track ball device 200*a*.

The track ball device 200*a* may be a device for measuring a rotation speed, a rotation direction and/or a rotation distance of a ball 200*a*_10 in the track ball device 200*a* by using a sensor or sensors. When the user rotates the ball 200*a*_10 in the track ball device 200*a*, the track ball device 200*a* may measure a movement speed, a movement direction and/or a movement distance of the ball 200*a*_10.

The device 100 may be connected to the track ball device 200*a* via a USB cable 410 but embodiments are not limited thereto. When the device 100 does not include a terminal for the USB cable 410, the device 100 may be connected to the track ball device 200*a* via an OTG cable 420 and the USB cable 410.

When connected to the track ball device 200a, the device 100 may display the cursor 10 on the touch screen 50.

Also, when connected to the track ball device 200a, the device 100 may receive a rotation speed, a rotation distance and/or a rotation direction of the ball 200a_10 from the track ball device 200a.

When the rotation speed, the rotation distance and/or rotation direction of the ball 200a_10 are received from the track ball device 200a, the device 100 may determine touch coordinates based on the received rotation speed, rotation distance and/or rotation direction of the ball 200a_10, and may generate a touch event at the determined touch coordinates.

Accordingly, the user may select a desired number or other icon from among numbers and icons displayed on the touch screen 50 by moving the ball 200a_10.

Figure 5:
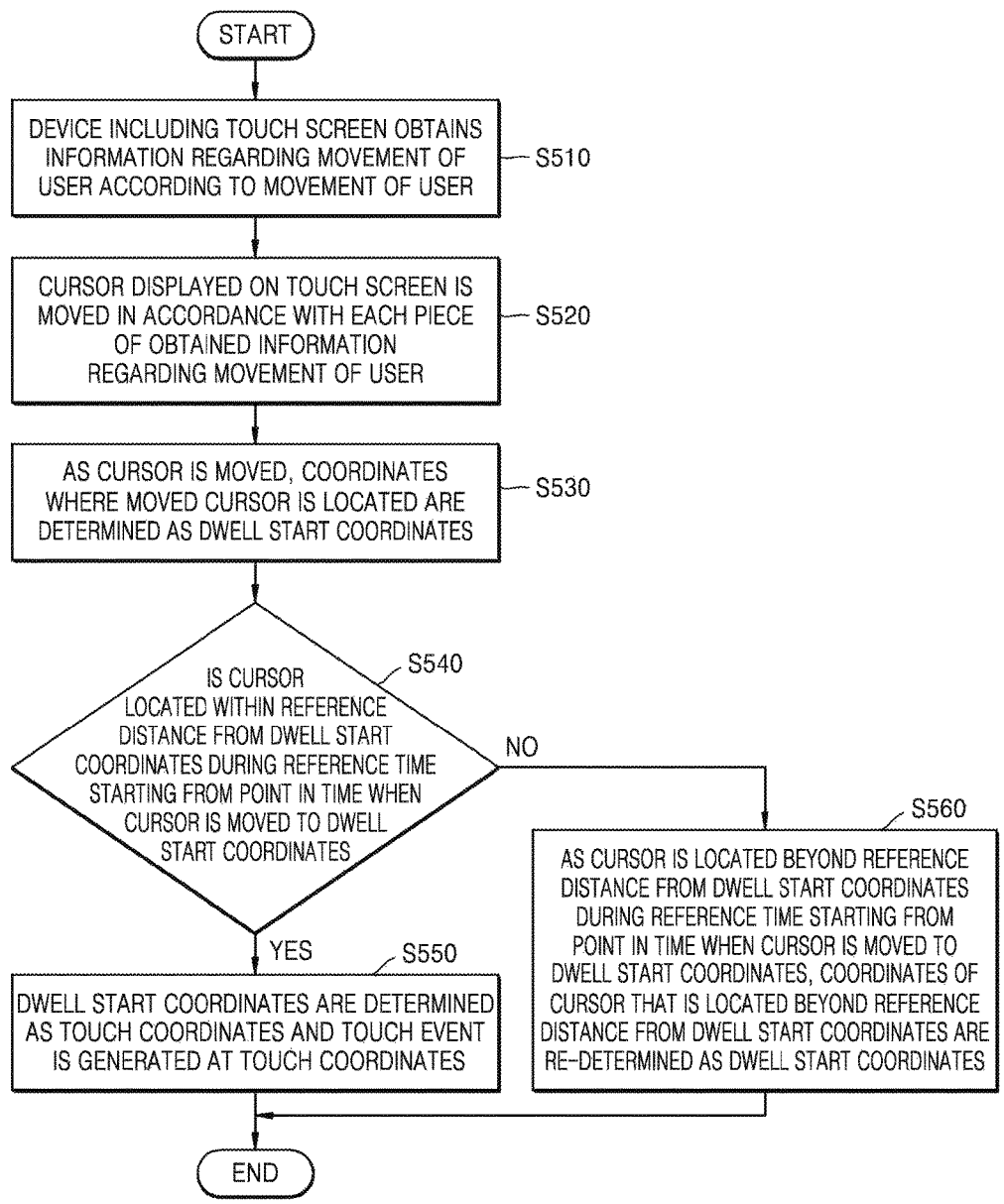
FIG. 5 is a flowchart of a method of generating, by a device, a touch event based on a movement of a user according to an embodiment of the present disclosure.

FIG. 5 is a flowchart of a method of generating, by the device, a touch event based on a movement of a user according to an embodiment of the present disclosure.

Referring to FIG. 5, in operation S510, as the user moves, the device 100 including a touch screen may obtain information regarding the movement of the user. In operation S520, the device 100 may move a cursor displayed on the touch screen in accordance with each piece of information regarding the movement of the user. In operation S530, when the cursor is moved, the device 100 may determine coordinates where the moved cursor is located as dwell start coordinates. Operations S510 to S530 are substantially as described above with reference to operations S210 to S230 of FIG. 2.

In operation S540, the device 100 may determine whether the cursor is located within a reference distance from the dwell start coordinates during a reference time starting from a point in time when the cursor is moved to the dwell start coordinates.

When the cursor is located within the reference distance from the dwell start coordinates during the entire reference time starting from the point in time when the cursor is moved to the dwell start coordinates in operation S540, the device 100 may determine the dwell start coordinates as touch coordinates, and may generate a touch event at the determined touch coordinates in operation S550.

When the cursor is located beyond the reference distance from the dwell start coordinates during the reference time starting from the point in time when the cursor is moved to the dwell start coordinates, the device 100 may re-determine coordinates of the cursor that is beyond the reference distance as dwell start coordinates in operation S560.

Figure 6A:
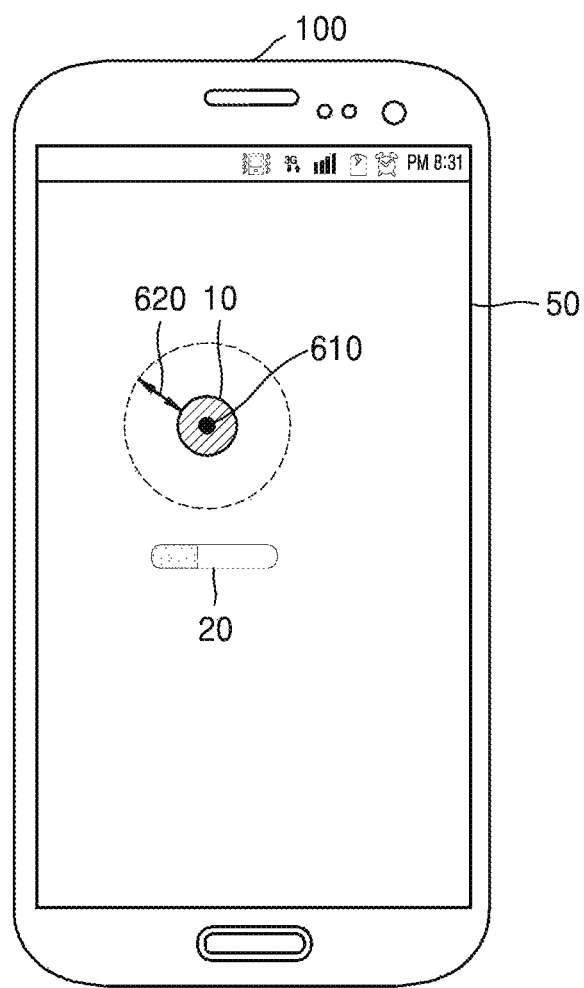
FIGS. 6A and 6B illustrate a method of displaying, by a device, an object indicating an elapsed portion of the reference time according to various embodiments of the present disclosure.
Figure 6B:
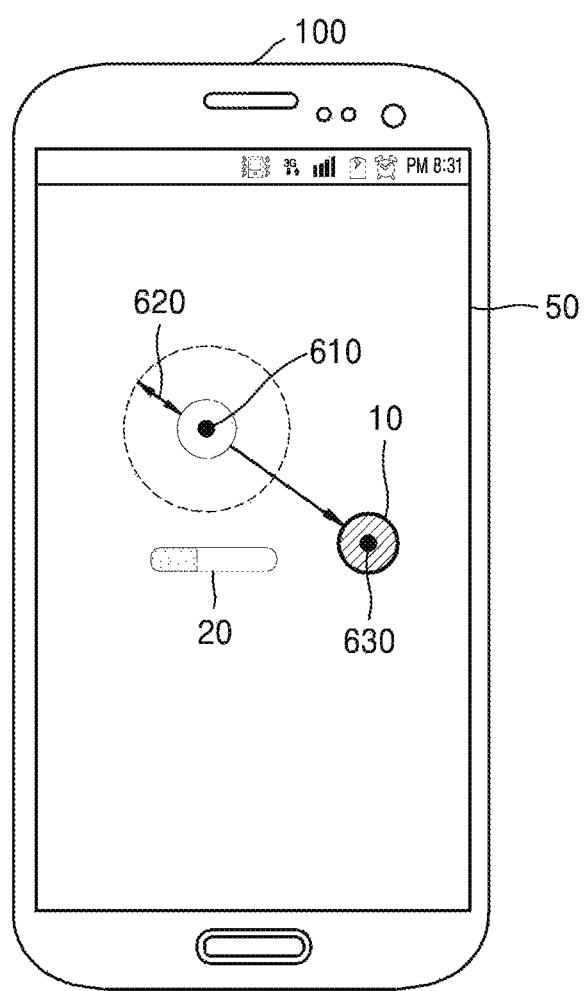

FIGS. 6A and 6B illustrate a method of displaying, by the device, an object indicating an elapsed time according to various embodiments of the present disclosure.

Referring to FIG. 6A, the device 100 may display the progress bar 20 on the touch screen 50 indicating an elapsed portion of the reference time.

When the cursor 10 is moved, the device 100 may determine coordinates where the cursor 10 is to be moved as dwell start coordinates 610 and may move the cursor 10 to the determined dwell start coordinates 610.

When the cursor 10 stays within the reference distance 620 with respect to the dwell start coordinates 610 during the reference time starting from a point in time when the cursor 10 is moved to the dwell start coordinates 610, the device 100 may display the progress bar 20 indicating the elapsed time. For example, as time elapses, the device 100 may display the progress bar 20 including a bar that extends as time elapses.

Referring to FIG. 6B, when the cursor 10 is located beyond the reference distance 620 with respect to the dwell start coordinates 610, the device 100 may re-determine a location where the cursor 10 is currently located as new dwell start coordinates 630.

For example, when the device 100 receives information regarding a movement of a movement member from the input device 200 after the cursor 10 is moved to the dwell start coordinates 610, the device 100 may determine coordinates where the cursor 10 is to be moved, based on the received information regarding the movement of the movement member.

When the coordinates where the cursor 10 is to be moved are determined, the device 100 may determine whether the coordinates where the cursor 10 is to be moved are beyond the reference distance 620 from the dwell start coordinates 610. When the coordinates where the cursor 10 is to be moved are beyond the reference distance 620 from the dwell start coordinates 610, the device 100 may determine the coordinates where the cursor 10 is to be moved as new dwell start coordinates 630. When the dwell start coordinates 630 are determined, the device 100 may move the cursor 10 to the dwell start coordinates 630.

Also, when the cursor 10 is located within the reference distance 620 from the dwell start coordinates 630 during the entire reference time starting from a point in time when the cursor 10 is moved to the dwell start coordinates 630, the device 100 may determine the dwell start coordinates 630 as touch coordinates and may generate a touch event at the touch coordinates.

According to various embodiments, when coordinates of the cursor 10 that are calculated based on information regarding a movement of the user are beyond coordinates of the touch screen 50, the device 100 may determine, as coordinates where the cursor 10 is to be moved, coordinates that are closest to the calculated coordinates from among coordinates of the touch screen 50 and may move the cursor 10 to the determined coordinates. Accordingly, although the user may move excessively, the device 100 may keep displaying the cursor 10 on the touch screen 50.

Figure 7A:
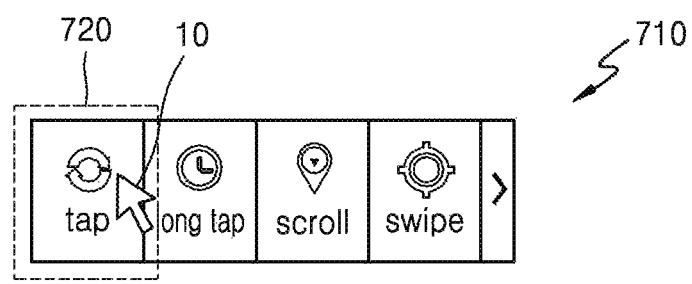
FIGS. 7A to 7C illustrate a method of showing, by a device, an elapsed portion of the reference time as a cursor is placed on a menu according to various embodiments of the present disclosure.
Figure 7B:
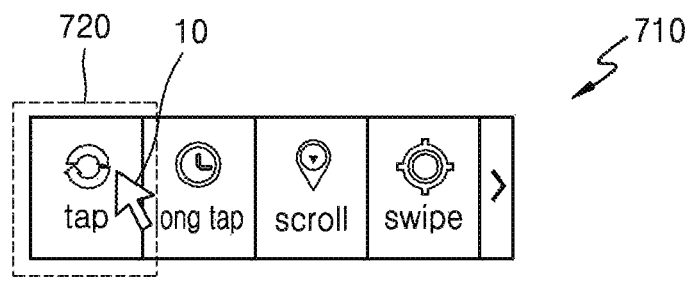
Figure 7C:
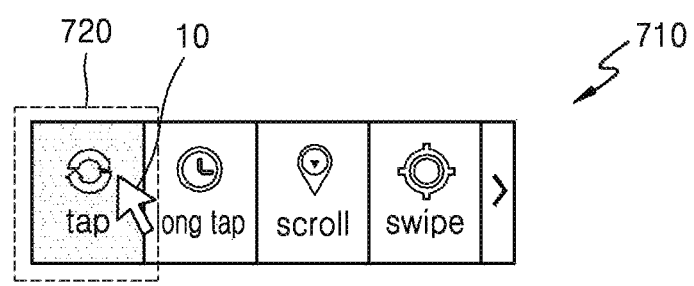

FIGS. 7A to 7C illustrate a method of showing an elapsed time as the cursor 10 is placed on a menu according to various embodiments of the present disclosure.

Referring to FIGS. 7A to 7C, when the cursor 10 is located on a menu 710 for selecting one of the items, the device 100 may indicate on the menu 710 that an item corresponding to a region where the cursor 10 is located may be selected.

For example, the device 100 may display the menu 710 for setting the touch event on the touch screen 50. The touch events may include a tap event, a long tap event, a scroll event, a swipe event, or the like. The menu 710 for setting the touch event may be classified into multiple regions corresponding to respective touch events.

When dwell start coordinates of the cursor 10, that are determined based on information regarding a movement of a movement member, are located in a region 720 corresponding to a tap event item, the device 100 may determine the tap event item as an identified item.

The device 100 may indicate an elapsed time on the region 720 corresponding to the tap event item during a reference time starting from a point in time when the cursor 10 is located on the region 720 corresponding to the tap event item. For example, as illustrated in FIGS. 7A to 7C, as time elapses, the device 100 may gradually change a color of the region 720 corresponding to the tap event item from the top of the region 720 to the bottom of the region 720, but embodiments are not limited thereto. Any number of changes to the region 720 can be provided to indicate elapsed time according to various embodiments of the present disclosure.

When the cursor 10 is located on the region 720 corresponding to the tap event item during the entire reference time starting from the point in time when the cursor 10 is located on the region 720, the device 100 may determine types of touch events as taps.

As the types of the touch events are determined as the taps, the device 100 may generate a tap event at touch coordinates when the touch coordinates are determined.

FIGS. 8A to 8D illustrate a method of displaying, by the device, a menu used to select one of items as the cursor is placed on a predetermined region according to various embodiments of the present disclosure.

Figure 8A:
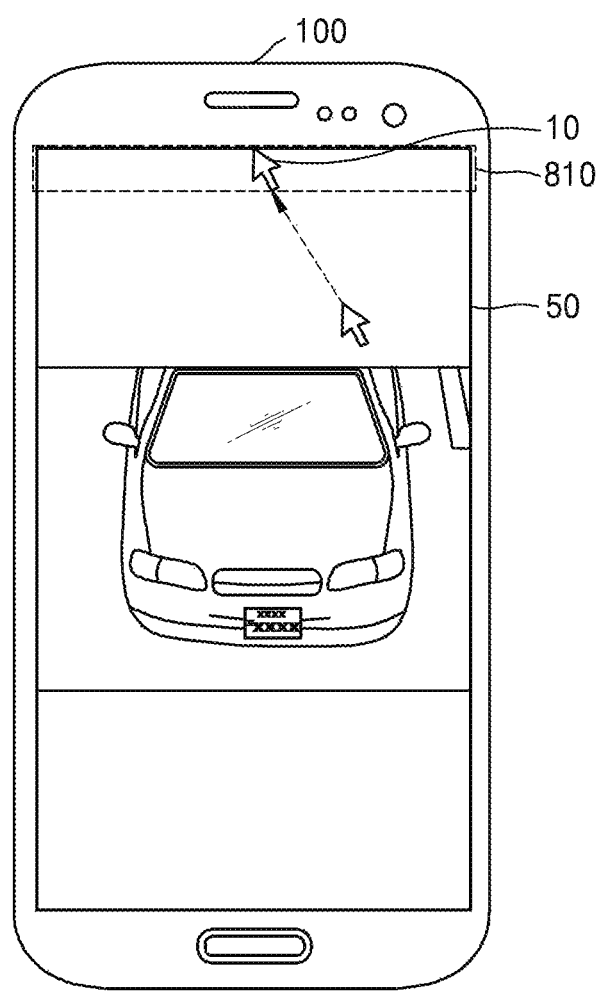
FIGS. 8A to 8D illustrate a method of displaying, by a device, a menu used to select one of items as a cursor is placed on a predetermined region according to various embodiments of the present disclosure.

Referring to FIG. 8A, when the cursor 10 is located on a predetermined region 810 of the touch screen 50, the device 100 may display a menu.

A region where a menu is displayed as the cursor 10 is located may be determined or predetermined by the device 100 among the entire touch screen 50. In this case, the predetermined region 810 may be displayed separately from other regions of the touch screen 50.

Figure 8B:
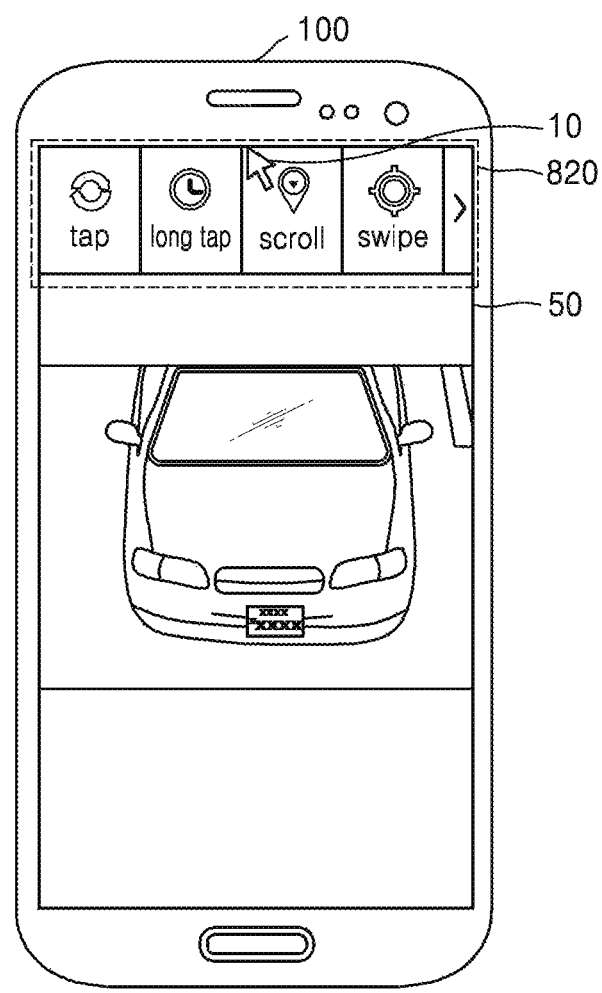

Referring to FIGS. 8A and 8B, when the cursor 10 is located on the predetermined region 810, the device 100 may display a predetermined menu. In this case, the device 100 may display the predetermined menu in a slide-down form.

For example, when the cursor 10 is located on the predetermined region 810 among upper regions of the touch screen 50, the device 100 may display a menu 820 for selecting one of the touch events as described above.

Figure 8C:
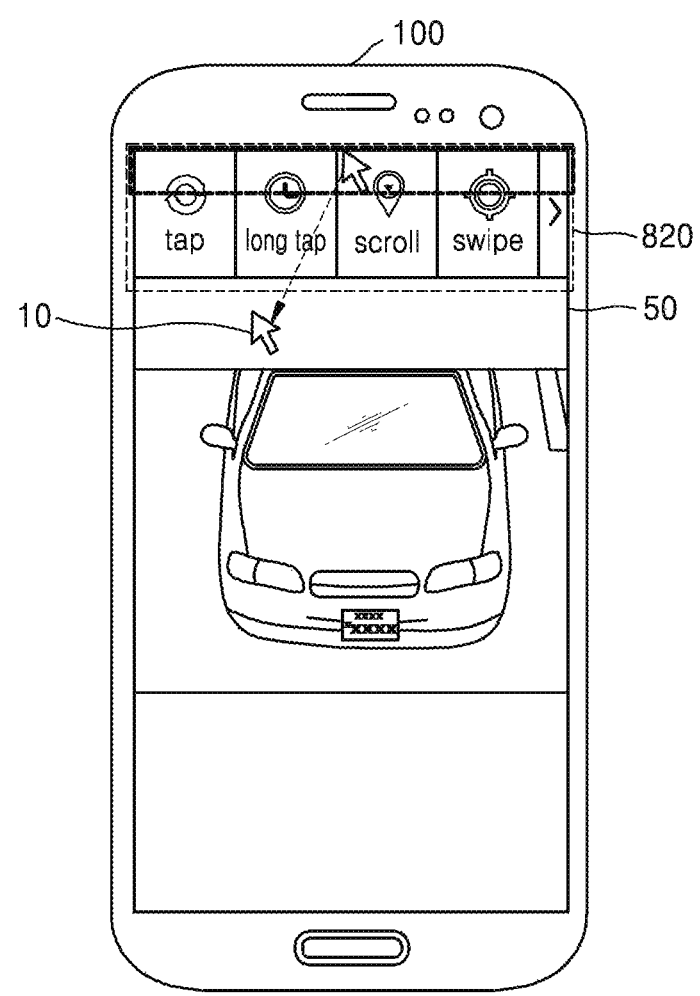
Figure 8D:
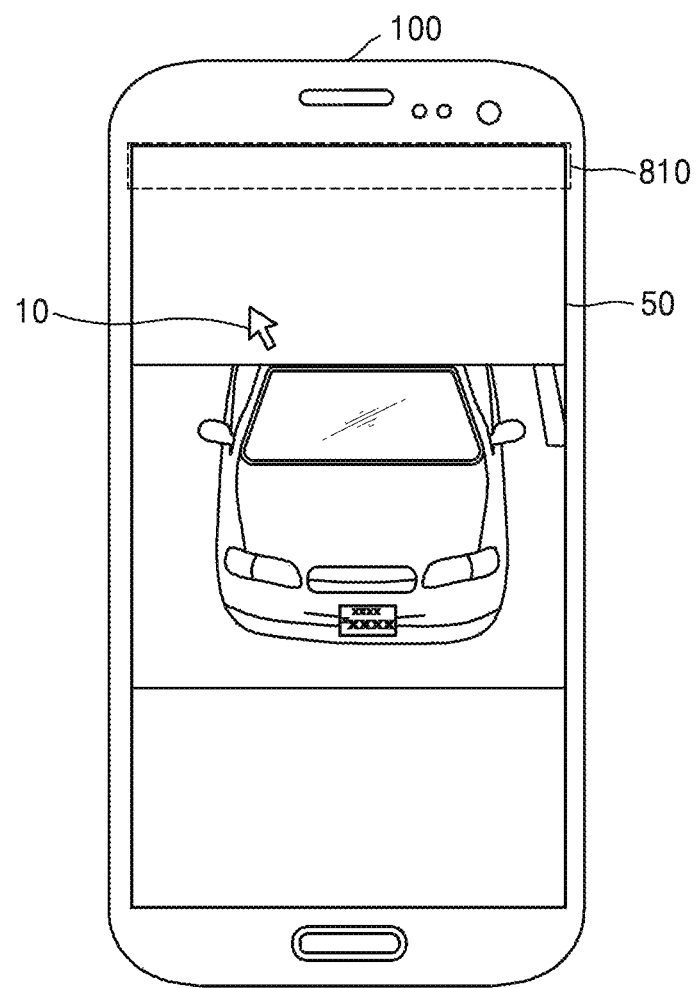

Also, referring to FIGS. 8C and 8D, as the cursor 10 is not located on a region where the menu 820 is displayed, the cursor 10 may remove the displayed menu 820. In this case, the device 100 may remove the displayed menu 820 in a slide-up manner.

Accordingly, the device 100 may display a menu only when the user requests the device 100 to display the menu. Therefore, although the touch screen 50 is small, the device 100 does not cover objects displayed on the touch screen 50 with a menu and may provide the menu only when the user requests the device 100 display the menu.

Figure 9A:
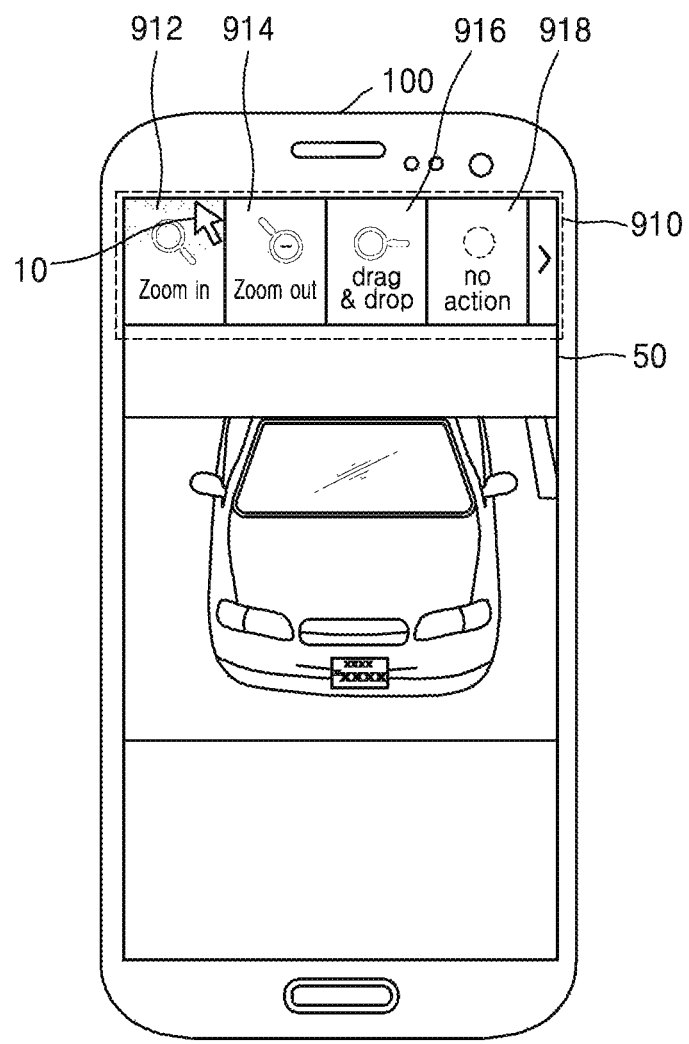
FIGS. 9A to 9C illustrate a method of receiving a user input for selecting a type of a touch event and performing, by a device, an operation based on the selected type of the touch event according to various embodiments of the present disclosure.
Figure 9B:
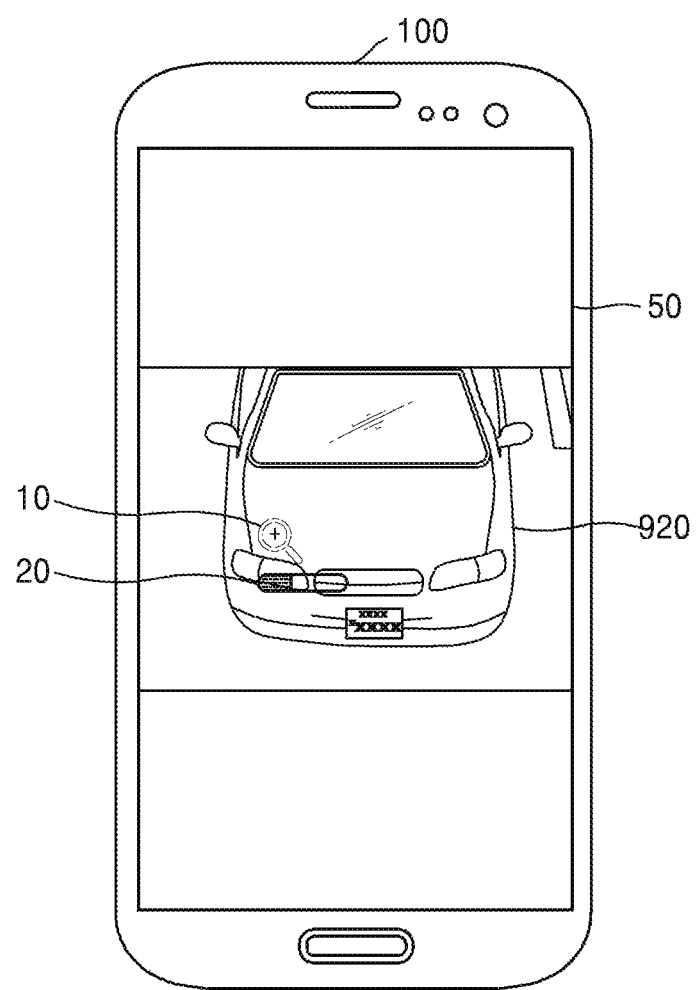
Figure 9C:
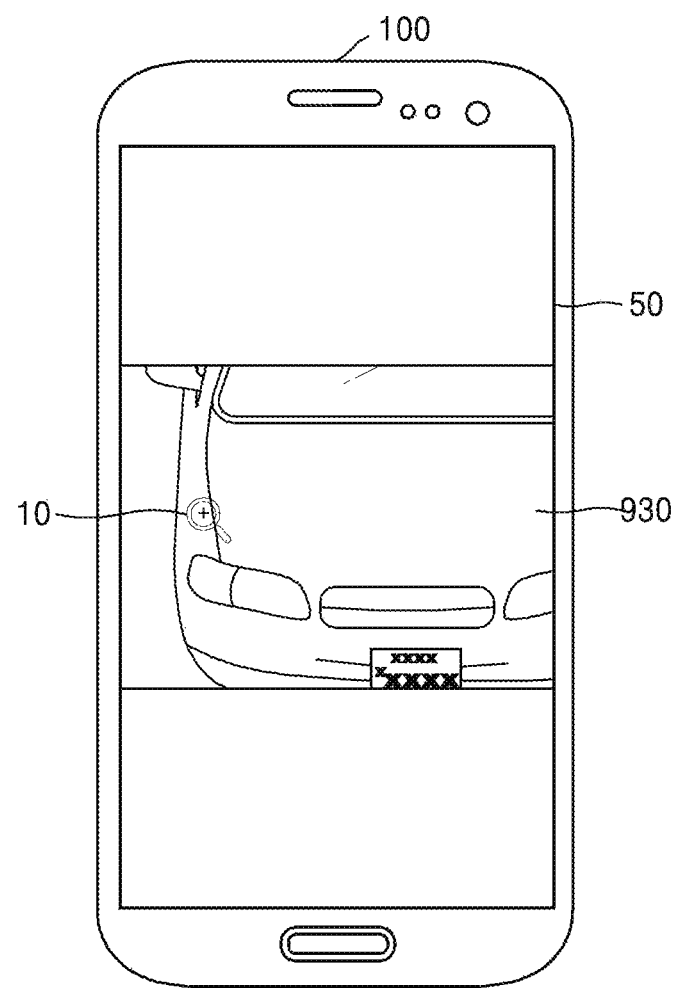

FIGS. 9A to 9C illustrate a method of receiving a user input for selecting a type of a touch event and performing, by the device, an operation based on the selected type of the touch event according to various embodiments of the present disclosure.

Referring to FIG. 9A, the device 100 may display a menu 910 on the touch screen 50 for selecting one of the touch events that is to be generated when a dwell gesture is detected.

The touch events may be zoom in 912, zoom out 914, drag and drop 916, or the like. Also, the menu 910 for selecting one of the touch events may include an item 918 for preventing a touch event from being generated even though the cursor 10 is located within the reference distance during the reference time.

When the cursor 10 is located on a region corresponding to the touch event zoom in 912 among regions corresponding to the touch events, the device 100 may determine the touch event zoom in 912 as an identified item and may indicate on the region corresponding to the touch event zoom in 912 the portion of the reference time that elapses.

If the cursor 10 is located on the region corresponding to the touch event zoom in 912 during the entire reference time, the device 100 may determine a type of a touch event as a zoom in event.

Referring to FIGS. 9B and 9C, since the type of the touch event is determined as the zoom in event, the device 100 may change a shape of the cursor 10 to a shape corresponding to the zoom in event. Shapes of the cursor 10 may be determined by the device 100 according to the types of the touch events. As the type of the touch event is selected, the device 100 may change the shape of the cursor 10 to a shape corresponding to the selected type of the touch event. Accordingly, the user may recognize a type of a touch event that is currently selected.

Since the type of the touch event is determined as the zoom in event, if the cursor 10 is located within the reference distance during the entire reference time illustrated by the progress bar 20, the device 100 may generate the zoom in event at touch coordinates. In this case, when a photo viewer application is being executed in the device 100, the device 100 may display a picture 920 on the touch screen 50 based on touch coordinates and a type of touch event. For example, when the touch coordinates are included in a region where the picture 920 is displayed, the device 100 enlarges a region of the picture 920 around a location where the touch coordinates are included, from among all regions of the picture 920 and may display the enlarged region 930 on the touch screen 50.

Also, when a map viewer application (not shown) is being executed in the device 100, and when the touch coordinates are included in a region where a map is displayed, the device 100 enlarges a region of the map around a location where the touch coordinates are included, from among all regions of the map and may display the enlarged region of the map on the touch screen 50.

Accordingly, a user with upper limb disability who has difficulty in performing various gestures on the touch screen by using his/her fingers may also control the device 100 such that events according to a tap event, a long tap event, a double touch event, a zoom in event, and a zoom out event may are generated.

Figure 10A:
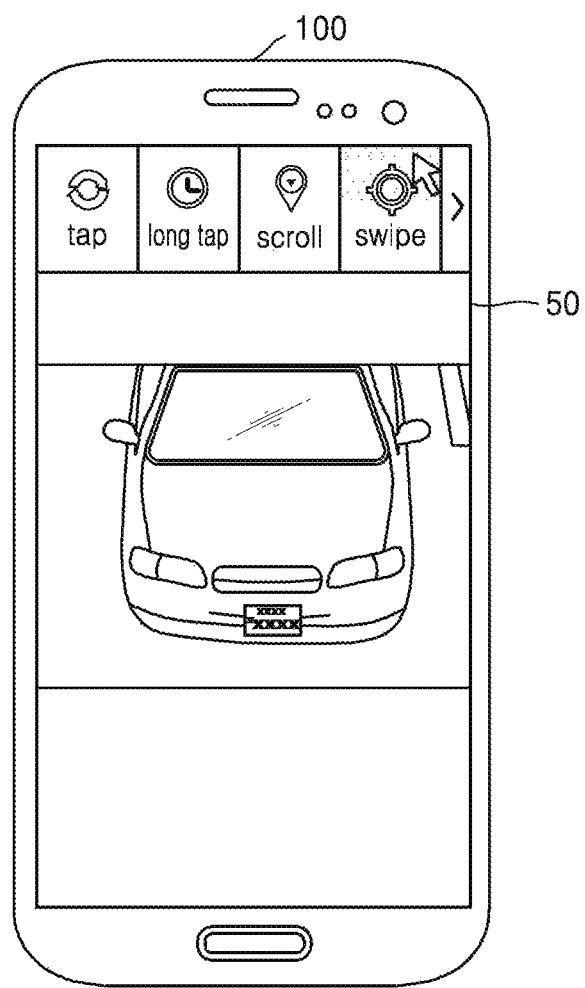
FIGS. 10A and 10B illustrate a method of receiving, by a device, a user input when a touch event to be generated when a dwell gesture is detected has an orientation according to various embodiments of the present disclosure.
Figure 10B:
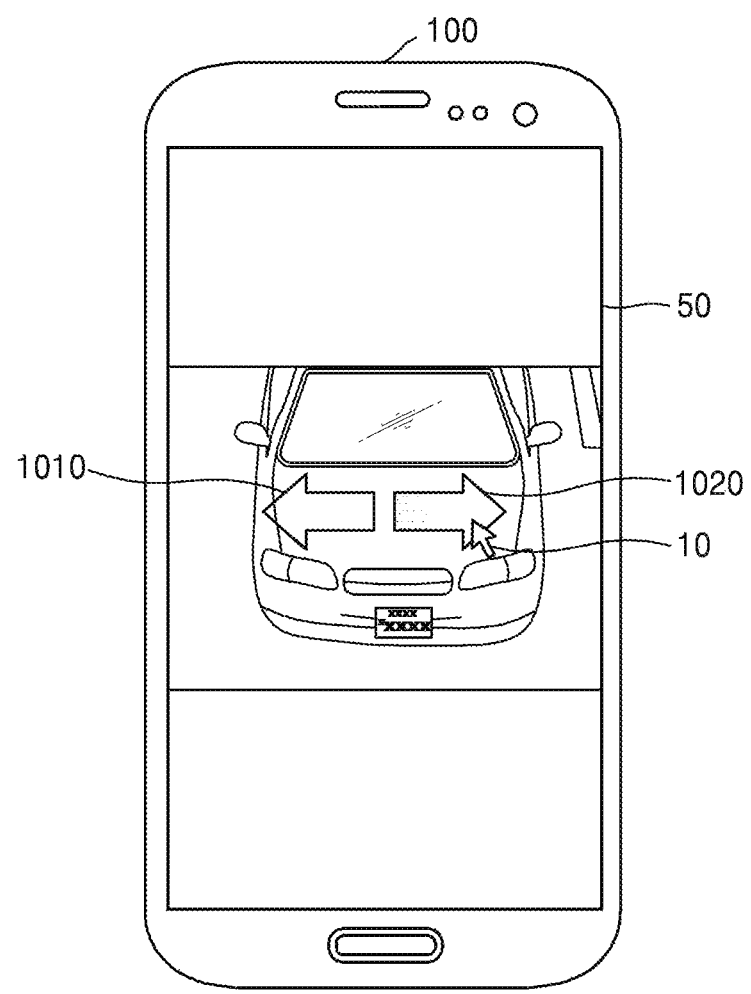

FIGS. 10A and 10B illustrate a method of receiving, by the device, a user input when a touch event to be generated when a dwell gesture is detected has an orientation according to various embodiments of the present disclosure.

Referring to FIG. 10A, the device 100 may receive a user input for selecting a swipe event on the touch screen 50 as a touch event to be generated when a dwell gesture is detected.

Referring to FIG. 10B, since the swipe event is selected as the touch event to be generated when the dwell gesture is detected, the device 100 may display a rightward arrow 1020 and a leftward arrow 1010 on the touch screen 50. In this case, the rightward arrow 1020 and the leftward arrow 1010 may be translucently displayed such that an object displayed on the touch screen 50 may be shown through the rightward arrow 1020 and the leftward arrow 1010.

The device 100 may generate a swipe event in a leftward direction once the reference time elapses from a point in time when the cursor 10 is located on the leftward arrow 1010 and may generate a swipe event in a rightward direction once the reference time elapses from a point in time when the cursor 10 is located on the rightward arrow 1020. Also, the device 100 may display an elapsed portion of the reference time of the cursor 10 on either the leftward arrow 1010 or on the rightward arrow 1020.

When a swipe event in the leftward direction is generated, the device 100 may display a picture that is previous to a picture displayed on the touch screen 50. Since the swipe event in the rightward direction is generated in the example of FIG. 10B, the device 100 may display a picture that is after a picture displayed on the touch screen 50.

Similar to the swipe event, if a scroll event is selected as a touch event to be generated when a dwell gesture is detected, the device 100 may display an upward arrow and a downward arrow on the touch screen 50 in a similar manner.

According to various embodiments, the device 100 may not display an arrow on the touch screen 50, and when first touch coordinates are determined, the device 100 may receive a user input for selecting a swipe direction. When second touch coordinates are determined, the device 100 may generate a swipe event in a set direction.

Accordingly, a touch gesture, for example, a swipe gesture, a scroll gesture, etc., for which one of directions has to be determined, may be conveniently and simply input.

FIGS. 11A to 11D illustrate a method of generating, by the device, a touch event when a touch event to be generated when a dwell gesture is detected consists of a combination of touch events according to various embodiments of the present disclosure.

Figure 11A:
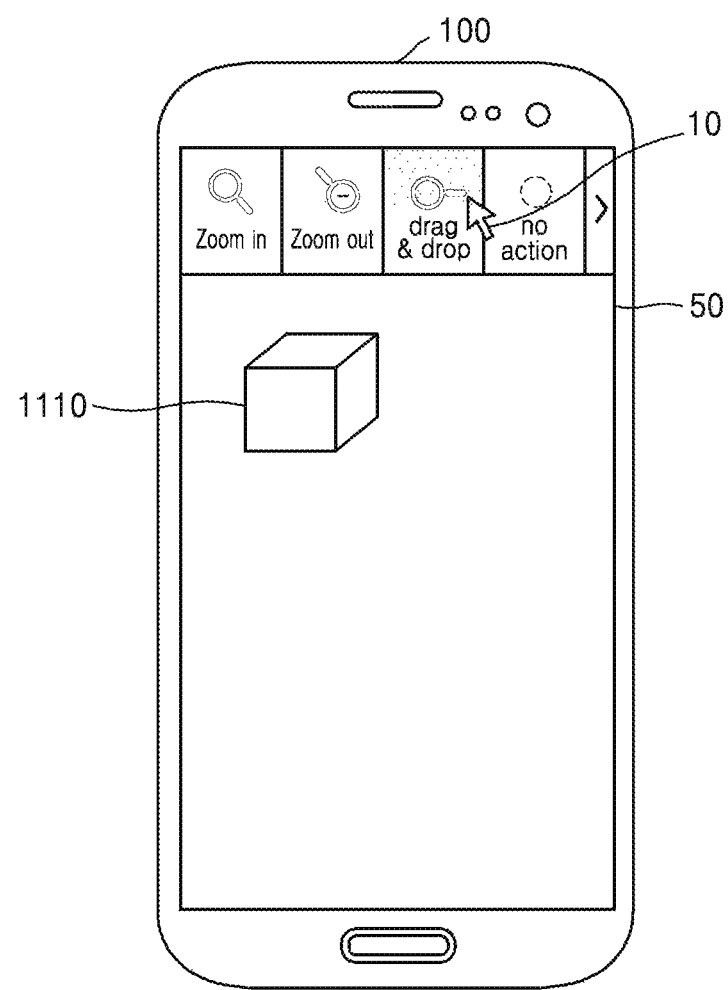
FIGS. 11A to 11D illustrate a method of generating, by a device, a touch event when a touch event to be generated when a dwell gesture is detected consists of a combination of touch events according to various embodiments of the present disclosure.

Referring to FIG. 11A, the device 100 may display the cursor 10 and an object 1110 on the touch screen 50, and may receive a user input for selecting a drag and drop event as a touch event to be generated when a dwell gesture is detected.

Figure 11B:
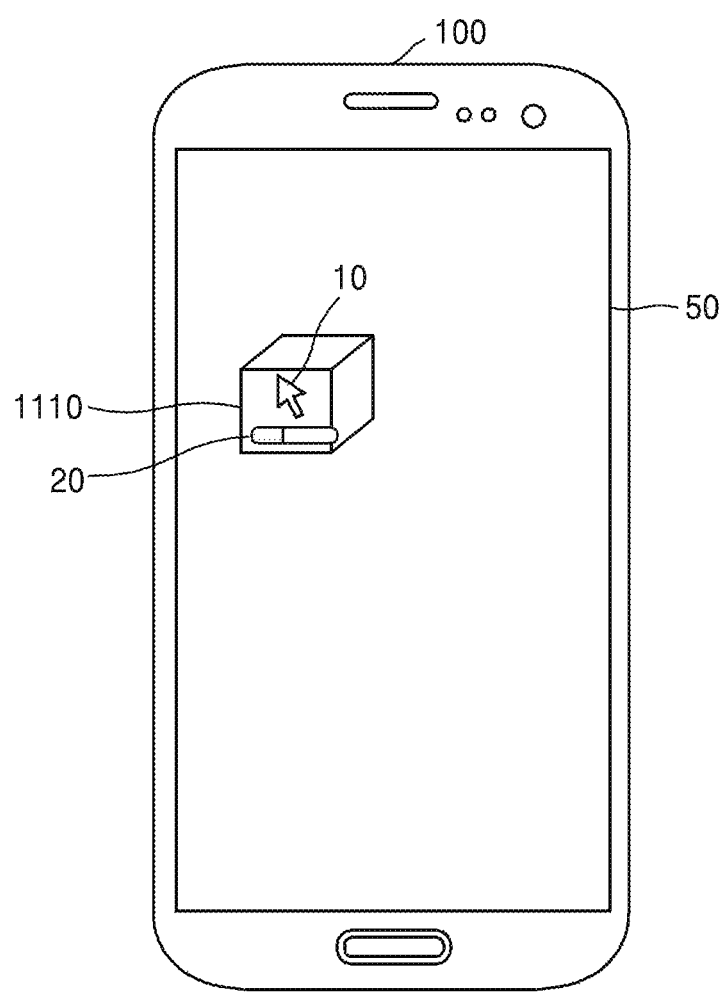

Referring to FIG. 11B, after the drag and drop event is selected as the touch event to be generated when the dwell gesture is detected, when touch coordinates are determined in a region where the object 1110 is displayed, the device 100 may generate a long tap event at the touch coordinates. In this case, the device 100 may display the progress bar 20 indicating the portion of the reference time that elapses.

Figure 11C:
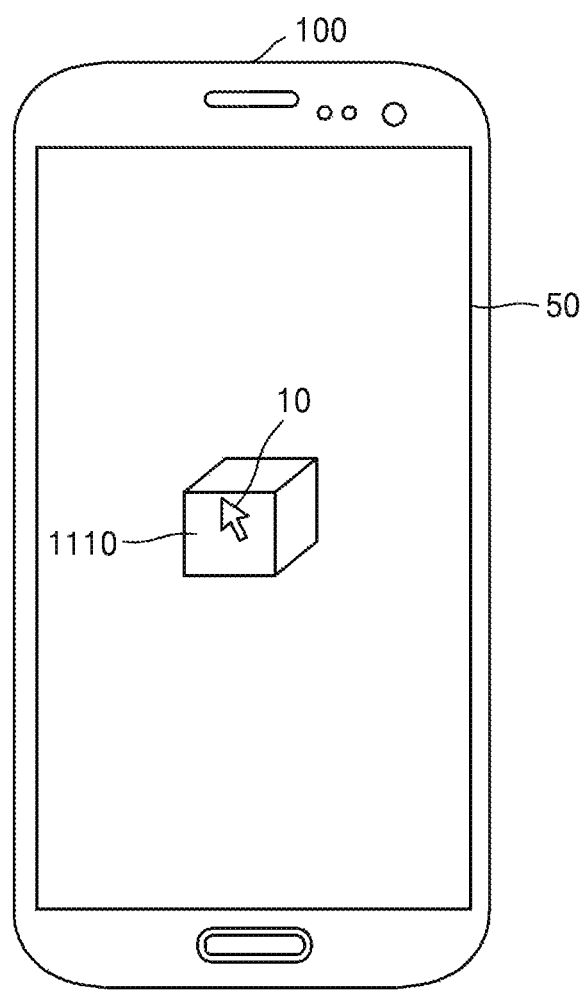

Referring to FIG. 11C, when the object 1110 is able to be moved, as the cursor 10 is moved, the device 100 may move the object 1110 together with the cursor 10 on the touch screen 50.

Figure 11D:
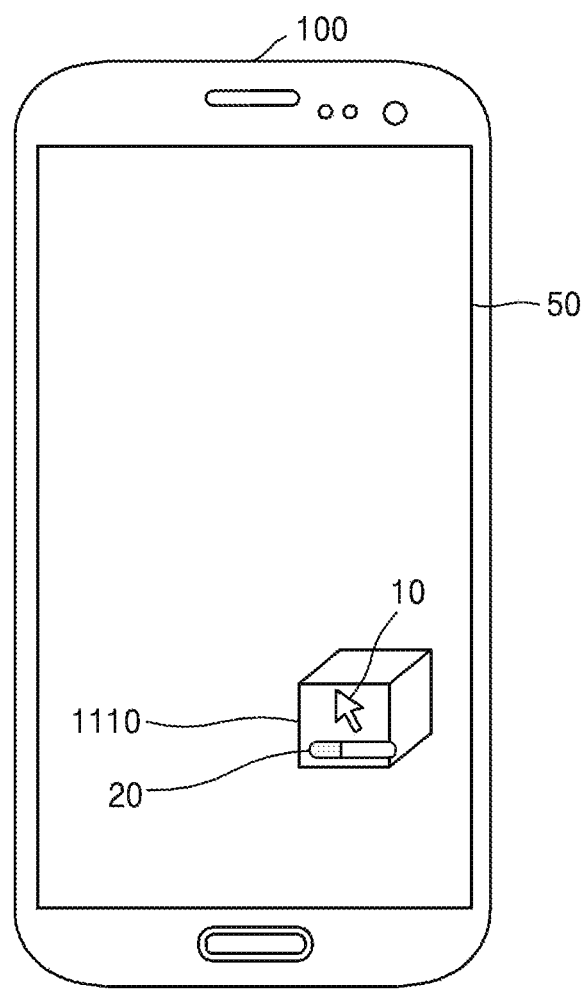

Referring to FIG. 11D, when the touch coordinates are determined while the object 1110 is moved together with the cursor 10, the device 100 may generate a drop event at the touch coordinates. Since the drop event is generated at the touch coordinates, the device 100 may place the object 1110 at the touch coordinates on the touch screen 50. In this case, the device 100 may display the progress bar 20 indicating the portion of the reference time that elapses.

Figure 12A:
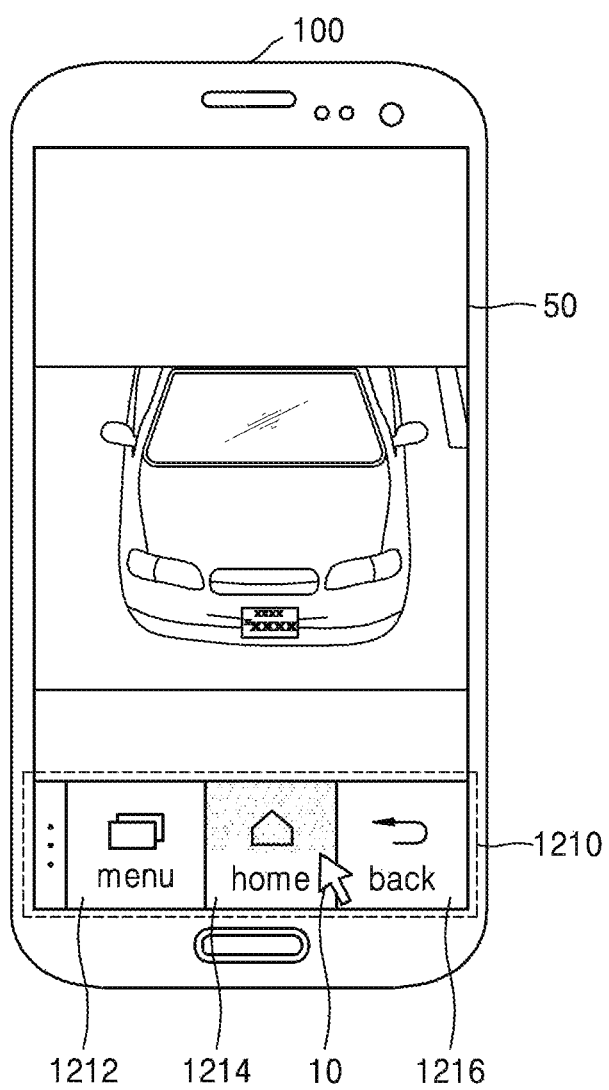
FIGS. 12A and 12B illustrate a method of displaying, by a device, a menu for providing a function of a physical touch button included in the device according to various embodiments of the present disclosure.
Figure 12B:
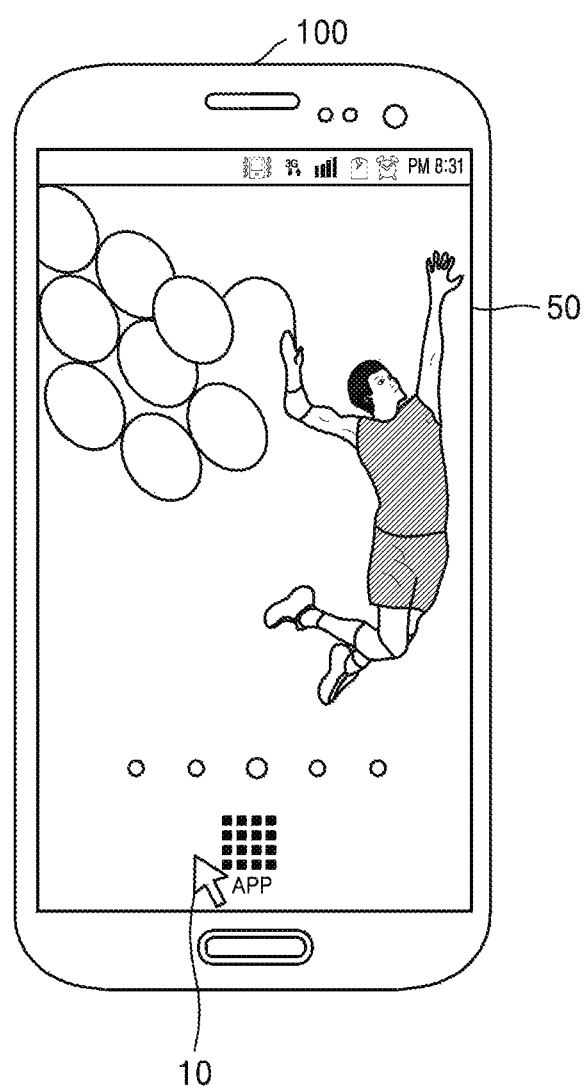

FIGS. 12A and 12B illustrate a method of displaying, by the device, a menu for providing a function of a physical touch button included in the device according to various embodiments of the present disclosure.

Referring to FIG. 12A, the device 100 may display a menu 1210 on the touch screen 50 for selecting one of functions of physical touch buttons.

For example, the device 100 may include a button 1212 for providing a menu, a button 1214 for returning to a home screen, and a button 1216 for moving to a previous page, but embodiments are not limited thereto.

When the cursor 10 is located on a predetermined region of the touch screen 50, the device 100 may display the menu 1210 for selecting one of an item corresponding to the button 1212 for providing the menu, an item corresponding to the button 1214 for returning to the home screen, and an item corresponding to the button 1216 for moving to the previous page. In this case, the predetermined region may be a region close to a location of one of the physical touch buttons.

Referring to FIG. 12B, when the cursor 10 stays on a region indicating the item 1214 corresponding to the button 1214 for returning to the home screen during the entire reference time, the device 100 executes a home application and may display a home screen on the touch screen 50.

Accordingly, although the user does not touch a physical touch button included in the device 100, the device 100 may allow the user to select the physical touch button by displaying the menu functioning as the physical touch button.

Figure 13A:
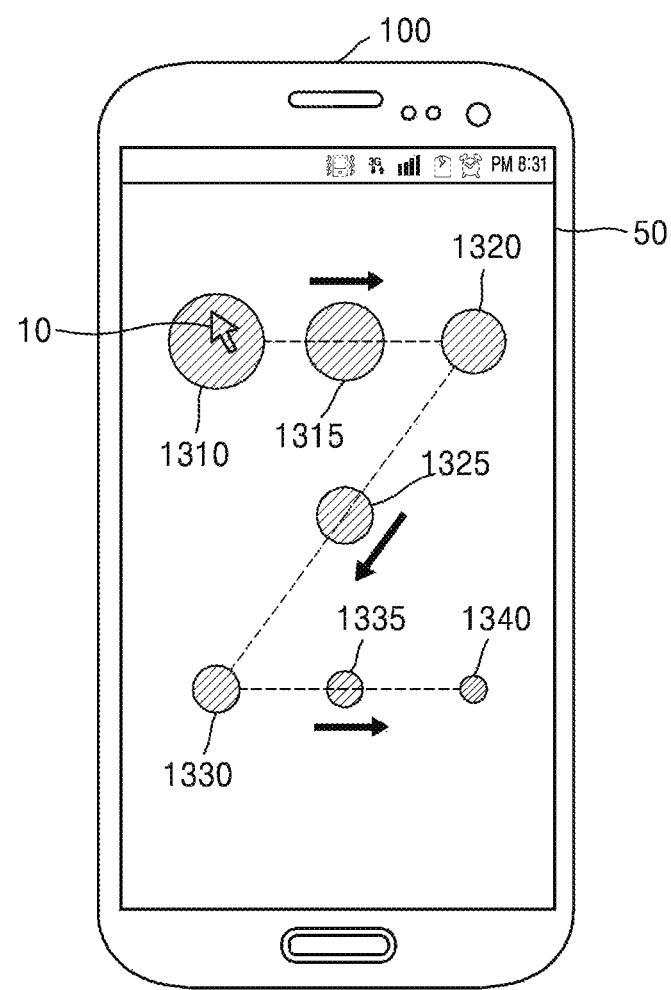
FIGS. 13A and 13B illustrate a method of setting, by a device, a reference distance based on a movement of a user according to various embodiments of the present disclosure.
Figure 13B:
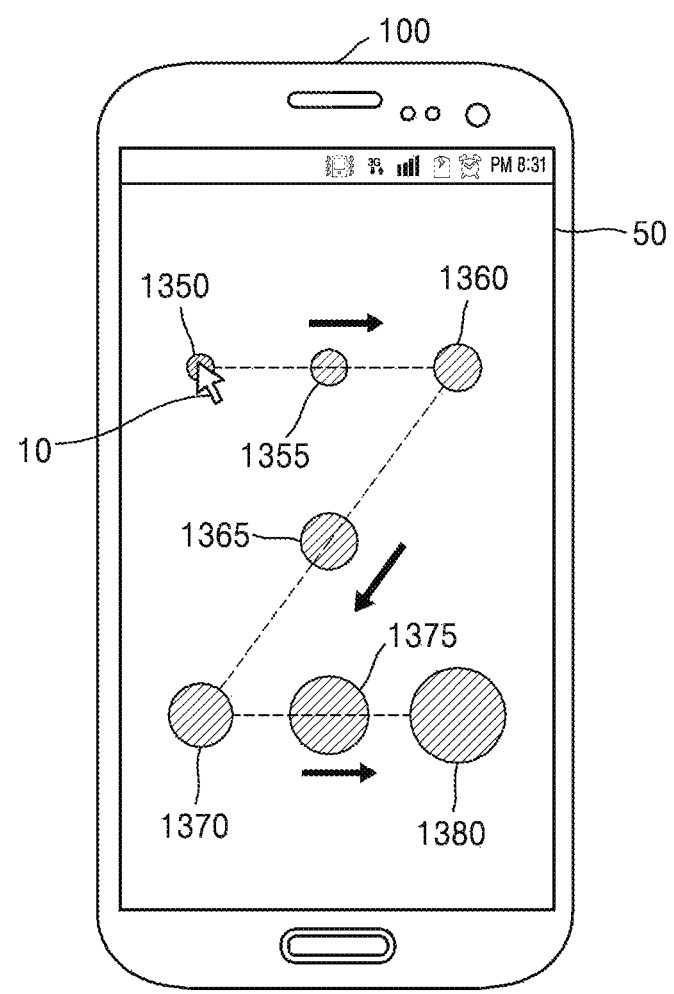

FIGS. 13A and 13B illustrate a method of setting, by the device, a reference distance based on a movement of the user according to various embodiments of the present disclosure.

Users with upper limb disabilities may have difficulty in manipulating the cursor 10 to allow the cursor 10 to stay within a small location during the entire reference time because the hands, limbs or other body parts of the users may shake uncontrollably. Also, since the users have different control abilities, reference distances have to be respectively set for the different users.

Referring to FIG. 13A, the device 100 may provide a calibration menu for setting a reference distance.

When receiving a user input for selecting the calibration menu, the device 100 may display a figure on the touch screen 50 and may set the reference distance based on whether the user can control the cursor 10 to remain located within the displayed figure during an entire reference time.

For example, when receiving the user input for selecting the calibration menu, the device 100 may display a circle 1310 that is the largest among circles 1310, 1315, 1320, 1325, 1330, 1335, and 1340 having different sizes and locations on the touch screen 50. When the cursor 10 is located within the circle 1310 during the entire reference time starting from a point in time when the cursor 10 is located within the largest circle 1310, the device 100 may display the second largest circle 1315 on the touch screen 50. When the cursor 10 is located within the circle 1315 during the entire reference time starting from a point in time when the cursor 10 is located within the second largest circle 1315, the device 100 may display the third largest circle 1320 on the touch screen 50.

If it is determined that a circle where the cursor 10 may not be controlled by the user to stay during the entire reference time has an $N^{th}$ size while the sizes of the circles are reduced, for example, circles 1310 to 1340, the device 100 may set a radius of a circle having an $N-1^{th}$ size as the reference distance, and the circle having the $N-1^{th}$ size is selected from among circles where the cursor 10 stays during the reference time.

The device 100 may display a circle on the touch screen 50 by reducing the sizes of the circles. In this case, the device 100 may determine a location where a circle is to be displayed based on a Z shape but embodiments are not limited thereto.

Also, referring to FIG. 13B, the device 100 may set a reference distance by increasing the sizes of the circles 1350, 1355, 1360, 1365, 1370, 1375, and 1380 on the touch screen 50.

For example, when receiving the user input for selecting the calibration menu, the device 100 may display, on the touch screen 50, the circle 1350 that is the smallest among the circles 1350, 1355, 1360, 1365, 1370, 1375, and 1380 having different sizes. When the cursor 10 may not be controlled by the user to stay within the displayed circle 1350 during the entire reference time starting from a point in time when the cursor 10 is located within the smallest circle 1350, the device 100 may display the second smallest circle 1355 on the touch screen 50.

If it is determined that a circle, where the cursor 10 may be controlled by the user to stay during the entire reference time, has an N$^{th}$ size while sizes of the circles 1350, 1355, 1360, 1365, 1370, 1375, and 1380 increase, the device 100 may set a radius of the circle having the N$^{th}$ size as the reference distance.

When the user selects the calibration menu, the device 100 may provide the calibration function. Also, when an application for generating a touch event based on a dwell gesture is executed by the device 100 for the first time, the device 100 may provide the calibration function.

Accordingly, the device 100 may set a reference distance corresponding to the user in accordance with a control ability of the user.

Also, the device may provide a UI for setting a reference distance as well as a reference time corresponding to the user. Accordingly, the user may properly set the reference time by using the UI for setting the reference time.

Figure 14:
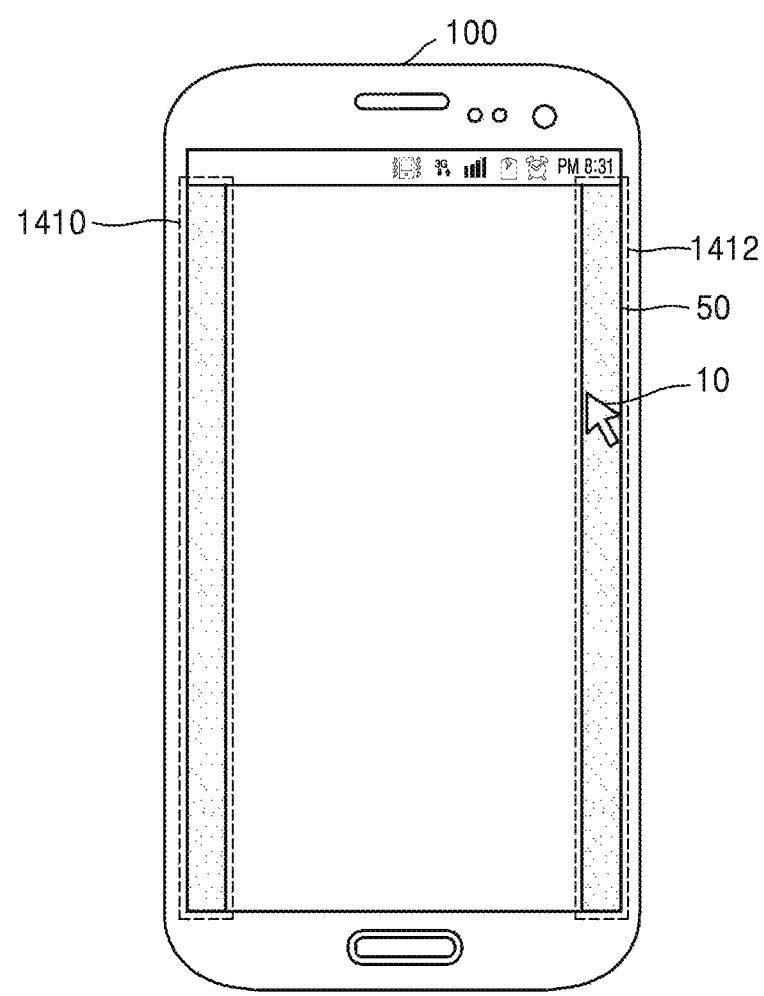
FIG. 14 illustrates non-active areas where a touch event is not generated even if a cursor is located there according to an embodiment of the present disclosure.

FIG. 14 illustrates a diagram of non-active areas where a touch event is not generated even though the cursor is located according to an embodiment of the present disclosure.

In the case of the mobile device 100 having a small touch screen, objects selectable by the user are displayed on most of the regions of the touch screen 50, and thus, if the cursor 10 stops, touch events that the user does not want to generate may keep being generated.

If the user does not want to manipulate the movement member or generate a touch event, the user may place the cursor 10 in non-active areas 1410 and 1412 such that touch events may not be generated.

Referring to FIG. 14, among the entire region of the touch screen 50, the non-active areas 1410 and 1412 where the touch event is not generated may be determined or predetermined by the device 100. For example, the non-active areas 1410 and 1412 may be areas within a predetermined distance from left and right edges of the touch screen 50 but embodiments are not limited thereto.

The device 100 may determine whether the cursor 10 is located in the non-active areas 1410 and 1412. When the cursor 10 is located in the non-active areas 1410 and 1412, the device 100 may not determine coordinates where the cursor 10 is located as dwell start coordinates. Also, the device 100 may not generate a touch event even though the cursor 10 stays in the non-active areas 1410 and 1412 for more than the reference time.

Figure 15A:
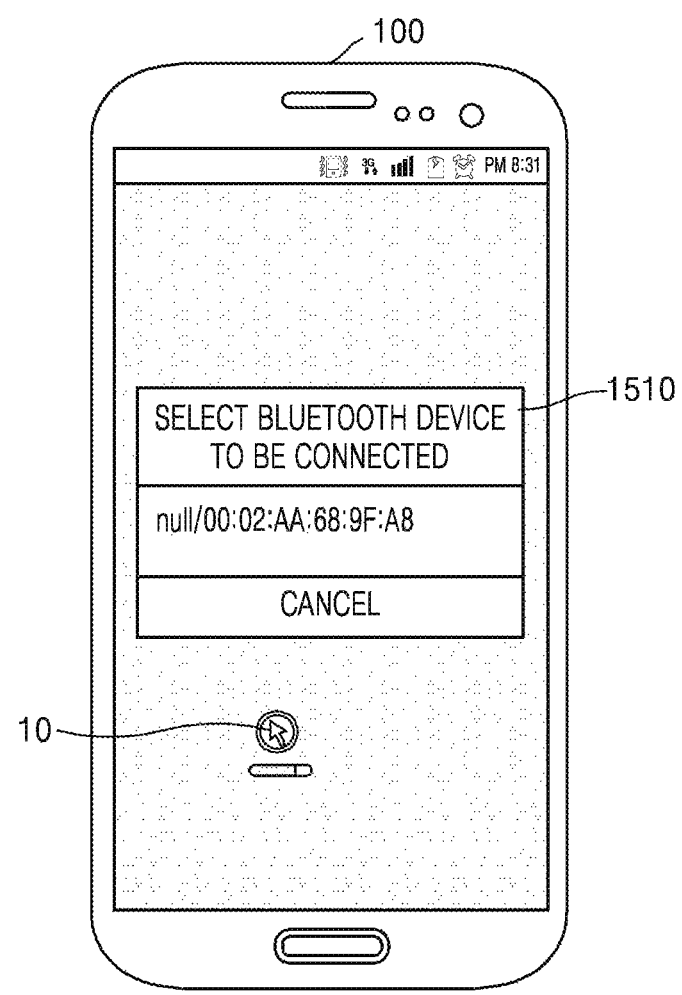
FIGS. 15A and 15B illustrate a method of transmitting, by a device, information regarding a movement of a user to a neighboring device according to various embodiments of the present disclosure.
Figure 15B:
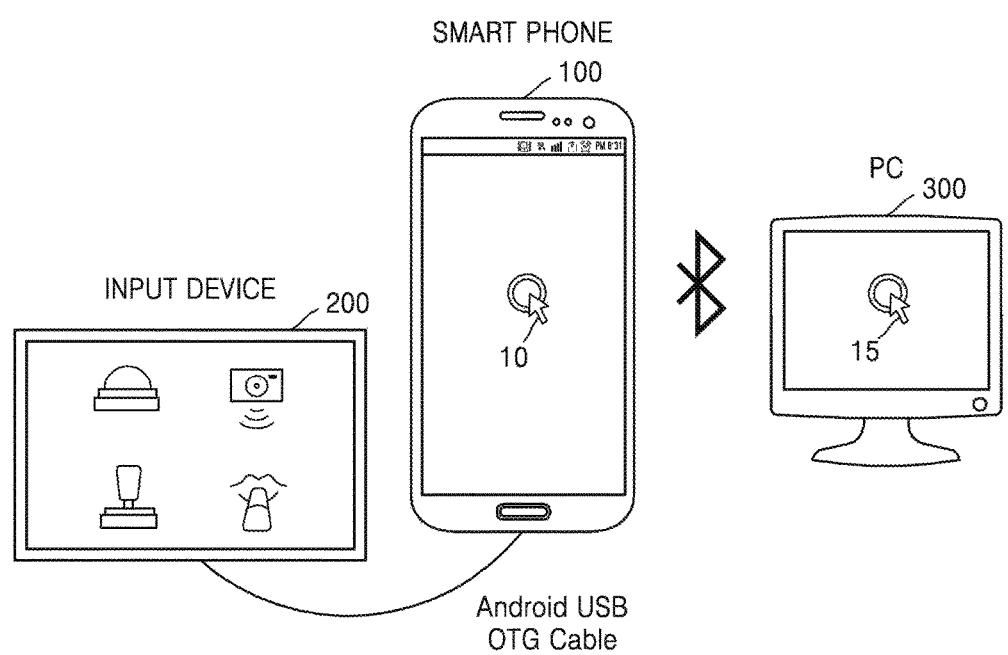

FIGS. 15A and 15B illustrate a method of transmitting, by the device, information regarding a movement of a user to a neighboring device according to various embodiments of the present disclosure.

Referring to FIGS. 15A and 15B, the device 100 may provide a menu 1510 for controlling the neighboring device 300 via short distance wireless communication.

When the device 100 receives a user input for selecting the menu for controlling the neighboring device 300, the device 100 may display a list of neighboring devices that may be connected via the short distance wireless communication from among neighboring devices. For example, the device 100 may display a list of neighboring devices that may perform a Bluetooth client function from among the neighboring devices.

When the device 100 receives a user input for selecting the menu for controlling the neighboring device 300, the device 100 may transmit a request for performing Bluetooth communication to the selected neighboring device 300.

Since the request is transmitted to the selected neighboring device 300, the device 100 and the selected neighboring device 300 may be connected to each other via the Bluetooth communication. In this case, the device 100 and the selected neighboring device 300 may be connected to each other via a virtual serial port.

As the device 100 and the selected neighboring device 300 may be connected to each other, the device 100 may not generate a touch event on the touch screen 50 even though a dwell gesture is detected.

Also, referring to FIG. 15B, as the device 100 and the selected neighboring device 300 may be connected to each other, the device 100 may transmit information regarding a movement of the user to the selected neighboring device 300. For example, the device 100, such as a smartphone, may transmit, to the selected neighboring device 300, such as a PC, a movement speed, a movement direction and/or a movement distance of the movement member that are received from the input device 200. The input device 200 can be connected to the device 100 in any number of ways, including an Android USB OTG Cable.

When the device 100 receives the information regarding the movement of the user from the device 100, the selected neighboring device 300 may generate a click event by detecting the dwell gesture.

For example, when the device 100 receives the information regarding the movement of the user from the device 100, the selected neighboring device 300 may move a cursor 15 displayed on a screen based on the received information regarding the movement of the user.

Also, when the cursor 15 stays within the reference distance during the entire reference time, the selected neighboring device 300 may generate a click event.

Accordingly, while using the device 100, the user may control a neighboring device that may be connected to the device 100 via the short distance wireless communication without a separate connection device.

Figure 16:
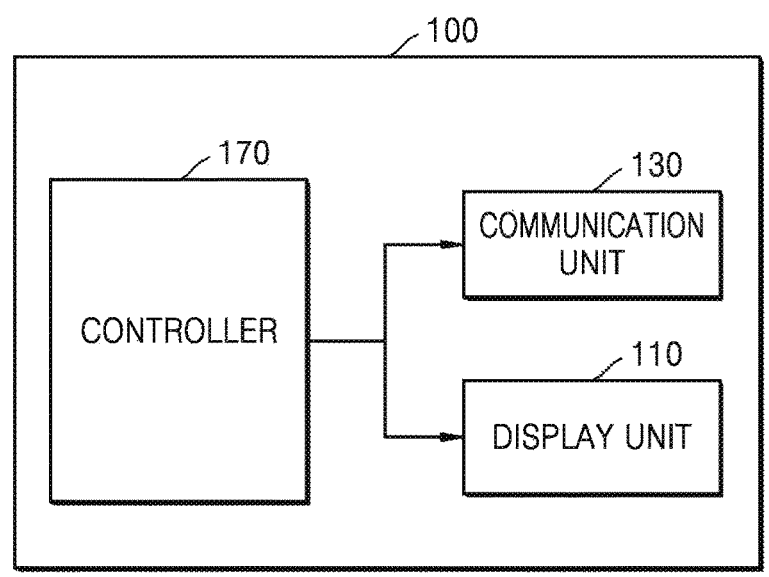
FIG. 16 is a block diagram of a device according to an embodiment of the present disclosure.

FIG. 16 is a block diagram of the device 100 according to an embodiment of the present disclosure.

Referring to FIG. 16, the device 100 may include a communication unit 130, a display unit 110, and a controller 170. However, not all of the components illustrated in FIG. 16 are necessary. The device 100 may be embodied by additional or fewer components than the components illustrated in FIG. 16.

The communication unit 130 may receive information regarding a movement of a user.

The display unit 110 may display an object on the touch screen 50 as an application is executed in the device 100.

The controller 170 may control overall operations of the device 100 including the communication unit 130 and the touch screen 50.

As a user moves, the communication unit 130 may obtain the information regarding the movement of the user.

Also, as the information regarding the movement of the user is obtained, the communication unit 130 may transmit, to a neighboring device, information regarding a movement of a movement member which is obtained via short distance communication.

The display unit 110 may display the cursor on the touch screen 50 as the movement of the user is detected.

Also, the display unit 110 may move the cursor displayed on the touch screen 50 in accordance with the obtained information regarding the movement of the user.

Also, the display unit 110 may display an object on the touch screen 50 indicating an elapsed portion of a reference time starting from a point in time when the cursor is moved to the dwell start coordinates.

Also, when the cursor is located within a predetermined area of the touch screen, the display unit 110 may display, on an area including the predetermined area, a menu for selecting one of items.

When the cursor is moved, the controller 170 may determine coordinates where the cursor is moved as the dwell start coordinates, and if the cursor is located within a reference distance during the entire reference time starting from a point in time when the cursor is moved to the dwell start coordinates, the controller 170 may determine the dwell start coordinates as touch coordinates.

Also, if the dwell start coordinates are determined as touch coordinates, the controller 170 may generate a touch event on the touch coordinates.

Also, if the cursor is separated from the dwell start coordinates by the reference distance or more during the reference time starting from the point in time when the cursor is moved to the dwell start coordinates, the controller 170 may re-determine, as the dwell start coordinates, coordinates of the cursor that are separated from the dwell start coordinates by the reference distance or more.

Also, the controller 170 may set the reference distance based on the information obtained regarding the movement of the user. In this case, the controller 170 may set the reference distance based on whether the cursor is located within a figure having a predetermined size during the reference time.

Figure 17:
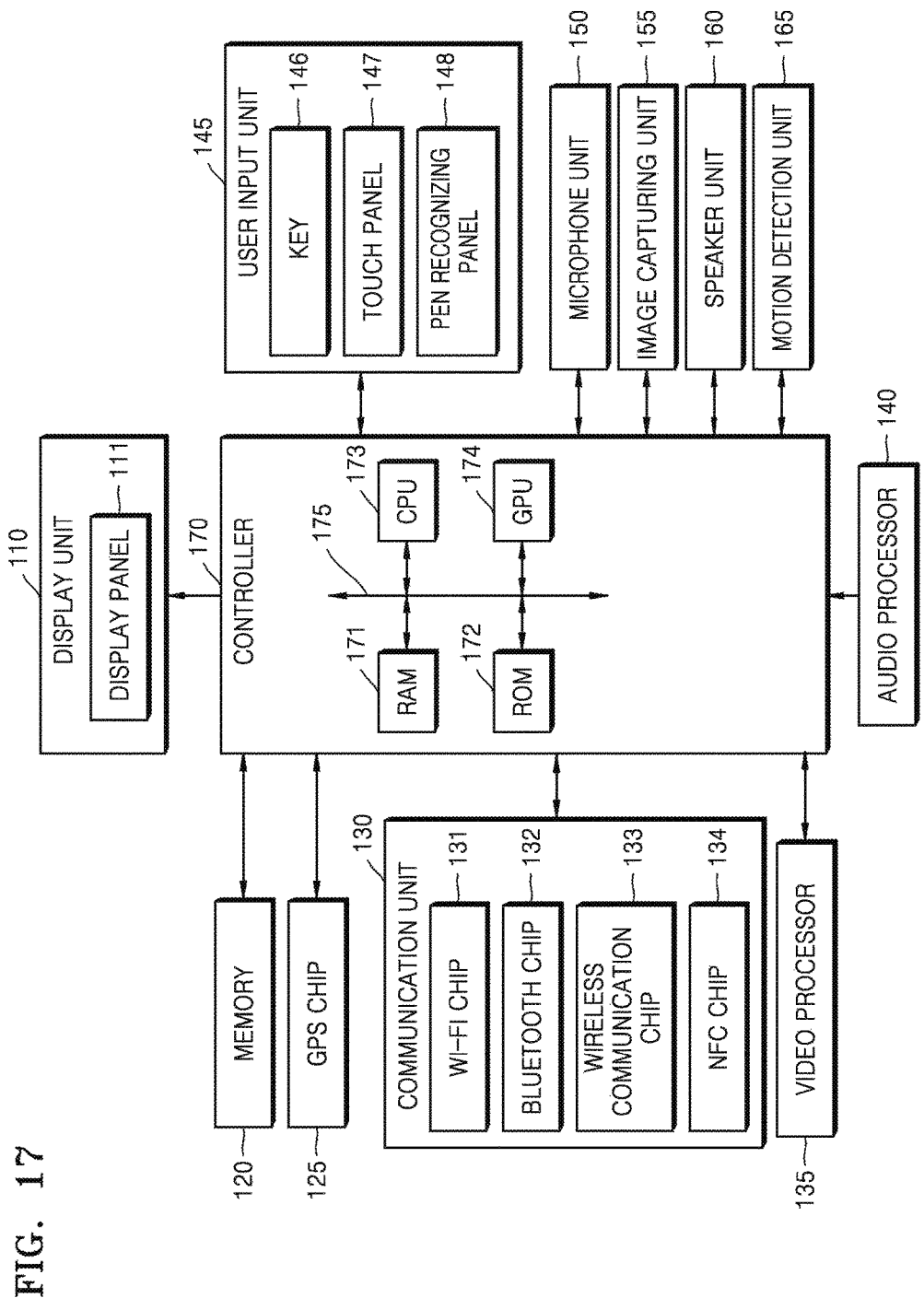
FIG. 17 is a block diagram of a device according to an embodiment of the present disclosure.

FIG. 17 is a block diagram of additional features of the device according to an embodiment of the present disclosure.

The device may be applied to various types of devices, for example, a mobile phone, a tablet personal computer (PC), a personal digital assistant (PDA), a Moving Picture Experts Group phase 1 or phase 2 (MPEG-1 or MPEG-2) audio layer 3 (MP3) player, a kiosk, an electronic frame, a navigation device, a digital television (TV), a wearable device such as a smart watch, a wrist watch, smart glasses, or a head-mount display (HMD), or the like.

Referring to FIG. 17, the device 100 of FIG. 16 may further include at least one of a memory 120, a global positioning system (GPS) chip 125, a video processor 135, an audio processor 140, a user input unit 145, a microphone unit 150, an image capturing unit 155, a speaker unit 160, and a motion detection unit 165 in addition to the communication unit 130, the display unit 110, and the controller 170.

The user input unit 145 may include a key 146, a touch panel 147 and a pen recognizing panel 148. Also, the display unit 110 may include a display panel 111, and a controller (not shown) for controlling the display panel 111. The display panel 111 may be variously embodied as, for example, a liquid crystal display (LCD), an organic light emitting diode (OLED), an active-matrix OLED (AM-OLED), a plasma display panel (PDP), or the like. The display panel 111 may be flexible, transparent, or wearable. The display unit 110 may be a touch screen (not shown) and function as the combination of the user input unit 145 and the touch panel 147. For example, the touch screen (not shown) may include a module of an integrated type that has a stack structure in which the display panel 111 and the touch panel 147 are stacked.

The memory 120 may include at least one of an internal memory (not shown) and an external memory (not shown).

The internal memory may include at least one of a volatile memory (e.g., dynamic random access memory (DRAM), static RAM (SRAM), synchronous dynamic RAM (SDRAM), etc.), a non-volatile memory (e.g., one time programmable read only memory (OTPROM), erasable and programmable ROM (EPROM), electrically erasable and programmable ROM (EEPROM), mask ROM, flash ROM, etc.), hard disk drive (HDD), and solid state drive (SSD). According to an embodiment, the controller 170 may load a command or data received from at least one of the non-volatile memory or other components onto the volatile memory and may process the loaded command or data. Also, the controller 170 may store data received from or generated by other components in the non-volatile memory.

The external memory may include, for example, at least one of compact flash (CF), secure digital (SD), micro-SD, mini-SD, extreme digital (xD), and other forms of memory sticks.

The memory 120 may store a program or data used to operate the device 100. For example, at least some content to be displayed on a locked screen may be temporarily or semi-permanently stored in the memory 120.

The controller 170 may control the display unit 110 such that some content stored in the memory 120 is displayed on the display unit 110. For example, the controller 170 may display some content stored in the memory 120 on the display unit 110. Alternatively, when a user gesture is detected in a region of the display unit 110, the controller 170 may perform a control operation corresponding to the user gesture.

The controller 170 may include at least one of a RAM 171, ROM 172, a central processing unit (CPU) 173, a graphics processing unit (GPU) 174, and a bus 175. The RAM 171, ROM 172, CPU 173, and GPU 174 may be connected to each other via the bus 175.

The CPU 173 accesses the memory 120 and performs booting by using an operating system (OS) stored in the memory 120. Also, the CPU 173 performs various operations by using diverse programs, content, data, or the like stored in the memory 120.

A set of commands, etc. used to boot the system are stored in the ROM 172. For example, when a turn-on command is input and thus power is supplied to the device 100, the OS stored in the memory 120 is copied to the RAM 171 according to the commands stored in the ROM 172, and the OS may be executed to boot the system. After booting the system, the CPU 173 copies programs that are stored in the memory 120 to the RAM 171 and executes the programs copied to the RAM 171 in order to perform various operations. After the mobile device 100 is booted, the GPU 174 displays a UI screen on a region of the display unit 110. In particular, the GPU 174 may generate a screen including various objects such as content, icons, and menus and display an electronic document thereon. The GPU 174 may calculate property values such as coordinates where respective objects are to be displayed, shapes, and sizes according to layouts of the screen. The GPU 174 may generate screens of various layouts including objects, based on the calculated property values. The screens generated by the GPU 174 are provided to the display unit 110 and may be displayed on respective regions of the display unit 110.

The GPS chip 125 receives a GPS signal from a GPS satellite and may calculate a current location of the mobile device 100. The controller 170 may calculate a location of the user by using the GPS chip 125 when a navigation program is used or a current location of the user is required.

The communication unit 130 may communicate with various external devices according to communication methods. The communication unit 130 may include at least one of a Wi-Fi chip 131, a Bluetooth chip 132, a wireless communication chip 133, and a near field communication (NFC) chip 134. The controller 170 may communicate with various external devices by using the communication unit 130.

The Wi-Fi chip 131 and the Bluetooth chip 132 may perform communication by a Wi-Fi method and a Bluetooth method, respectively. When the Wi-Fi chip 131 or the Bluetooth chip 132 is used, various pieces of connection information such as a service set identifier (SSID) and a session key are received/transmitted first for communication, and then various pieces of information may be received/transmitted. The wireless communication chip 133 may be a chip for performing communication according to various communication standards such as institute of electrical and electronics engineers (IEEE), Zigbee, $3^{rd}$ generation (3G), 3rd generation partnership project (3GPP), and long term evolution (LTE). The NFC chip 134 may be a chip operating by an NFC method using a band of 13.56 MHz among various radio frequency (RF)-ID frequency bands such as 135 kHz, 13.56 MHz, 433 MHz, 860-960 MHz, and 2.45 GHz.

The video processor 135 may process video data included in content received by the communication unit 130 or content stored in the memory 120. The video processor 135 may process images through, for example, decoding, scaling, noise filtering, frame rate conversion, and a resolution change with regard to video data.

The audio processor 140 may process audio data included in the content received by the communication unit 130 or the content stored in the memory 120. The audio processor 140 may perform various processes such as decoding, amplification, and noise filtering with regard to the audio data.

The controller 170 may operate the video processor 135 and the audio processor 140 when a reproduction program is executed for multimedia content and may reproduce the same. A speaker of the speaker unit 160 may output audio data generated by the audio processor 140.

The user input unit 145 may receive commands from the user. The user input unit 145 may include at least one of the key 146, the touch panel 147, and the pen detection panel 148.

The key 146 may include various types of keys such as a mechanical button, and/or a wheel formed on external surfaces of a main body of the mobile device 100, for example, a front surface, side surfaces, a rear surface, etc.

The touch panel 147 may detect a touch input of the user and may output a touch event value corresponding to the detected touch input. When a touch screen (not shown) is formed when the touch panel 147 and the display panel 111 are combined, the touch screen may be embodied as various types of sensors such as capacitive sensors, pressure resistive sensors, and piezoelectric sensors. The capacitive sensor uses a method of using a dielectric substance that coats a surface of the touch screen in order to detect and calculate electricity flowing to a body of the user when a body part of the user touches the surface of the touch screen. The pressure resistive sensor has upper and lower electrode plates embedded in the touch screen and uses a method of detecting electricity that flows when the user touches the screen and when touched portions of the upper and lower electrode plates contact each other and of calculating touch coordinates. A touch event generated in the touch screen may be mainly generated by fingers of the user, but may also be generated by a product formed of a conductive material that may cause a capacitance variation.

For example, the pen detection panel 148 may detect a proximity input or touch input of a pen used by the user (e.g., a stylus pen, a digitizer pen, etc.) and may output a pen proximity event or a pen touch event according to the detected proximity input or touch input. The pen detection panel 148 may be used in, for example, an electromagnetic resonance (EMR) method, and may detect a touch input or a proximity input according to an intensity change in an electromagnetic field caused by a proximity touch or direct touch of the pen. In detail, the pen detection panel 148 may include an electromagnetic induction coil sensor (not shown) having a grid structure and an electronic signal processing unit (not shown) for sequentially providing an alternating current (AC) signal having a predetermined frequency to each loop coil in the electromagnetic induction coil sensor. When a pen including a resonance circuit is placed around the loop coil of the pen detection panel 148, a magnetic field received from the loop coil generates a current in the resonance coil based on mutual electromagnetic induction. Based on the current, an induction field is generated from the coils forming the resonance circuit in the pen, and the pen detection panel 148 detects the induction field from the loop coil that is in a signal reception state, and thus, a contact location or a touched location of the pen may be detected. The pen detection panel 148 may be provided at a certain area on a bottom portion of the display panel 111, for example, an area for covering a display area of the display panel 111.

A microphone of the microphone unit 150 may receive a voice of the user or other sounds and may convert the received voice or sounds into audio data. The controller 170 may use the voice of the user input via the microphone unit 150 when the user makes a call or may convert the voice into audio data and store converted audio data in the memory 120.

The image capturing unit 155 may capture a still image or a moving image according to the control of the user. The image capturing unit 155 may be embodied as multiple image capturing units such as a front-facing camera, a rear-facing camera, or a combination of front- and rear-facing cameras.

When the image capturing unit 155 and the microphone unit 150 are prepared, the controller 170 may control the image capturing unit 155 and the microphone unit 150 according to a voice of the user input via the microphone unit 150 or a user's motion detected by the image capturing unit 155. For example, the mobile device 100 may operate in a motion control mode or a voice control mode. When the mobile device 100 operates in the motion control mode, the controller 170 may activate the image capturing unit 155 such that an image of the user may be captured, or may perform control operations by tracking changes of user's motions. When the mobile device 100 operates in the voice control mode, the controller 170 may analyze the voice of the user input via the microphone unit 150 and may operate in a voice recognition mode in which a control operation is performed according to the analyzed voice.

The movement detection unit 165 may detect a movement of a main body of the device 100. The mobile device 100 may rotate or may be tilted in various directions. In this case, the movement detection unit 165 may detect a movement property such as a rotation direction, an angle, a tilt degree, etc., by using at least one of various sensors such as geomagnetic sensors, gyro sensors, and acceleration sensors but embodiments are not limited thereto.

Although not illustrated in FIG. 17, the device 100 may further include a USB port that may be connected to a USB connector, or external input ports, for example, a headset, a mouse, and a local area network (LAN), which are connected to external terminals, a digital multimedia broadcasting (DMB) chip that receives and processes DMB signals, sensors, or the like.

Names of the components of the device 100 may differ. Also, the mobile device 100 may include at least one of the aforementioned components and may not include some components or may further include additional components.

Various embodiments may be embodied as a non-transitory computer-readable medium, for example, a program module executable by a computer, including commands executable by a computer. The non-transitory computer-readable medium may be an arbitrary medium accessed by a computer and includes a volatile/non-volatile medium and a removable medium. Also, the non-transitory computer-readable medium may include a storage medium and a communication medium. The storage medium includes a computer-readable command, a data structure, a program module, a volatile/non-volatile medium, or a removable medium, the volatile/non-volatile medium, and a removable medium embodied by an arbitrary method or technology of storing information such as data. The communication medium includes a computer-readable command, a data structure, a program module, data of a modulated data signal, or another transmission mechanism and also includes an arbitrary information transmission medium.

It should be understood that various embodiments described herein should be considered in a descriptive sense only and not for purposes of limitation. Descriptions of features or aspects within each embodiment should typically be considered as available for other similar features or aspects in other various embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A device for receiving a user input, the device comprising:
    a display configured to display a cursor in accordance with movement information of a user device; and
    at least one processor configured to:
        determine first touch coordinates and generate a first touch event at the first touch coordinates,
        in response to the user device being moved by a user, obtain the movement information of the user device, change the first touch coordinates based on the movement information of the user device, and control the display to display the cursor based on the changed first touch coordinates,
        in response to the cursor moving beyond a reference distance from the first touch coordinates, determine coordinates to where the cursor is moved as dwell start coordinates, and
        in response to the cursor being located within the reference distance from the dwell start coordinates during an entire reference time starting from a point in time when the cursor is moved to the dwell start coordinates, determine the dwell start coordinates as second touch coordinates and generate a second touch event at the second touch coordinates.

2. The device of claim 1, wherein the at least one processor is further configured to generate the second touch event at the second touch coordinates when the dwell start coordinates are determined as the second touch coordinates.

3. The device of claim 1, wherein the at least one processor is further configured to re-determine coordinates of the cursor as the dwell start coordinates when the cursor is moved beyond the reference distance from the dwell start coordinates during the reference time.

4. The device of claim 1, wherein the display is further configured to display the cursor as the movement information of the user device is obtained.

5. The device of claim 1, wherein the display is further configured to display an object indicating an elapsed portion of the reference time.

6. The device of claim 1, wherein the display is further configured to display a menu for selecting one of items in a predetermined region when the cursor is located in the predetermined region of the display.

7. The device of claim 1, wherein the at least one processor is further configured to set the reference distance based on the obtained movement information of the user device.

8. The device of claim 7,
    wherein the display is further configured to display a figure having a predetermined size, and
    wherein the at least one processor is further configured to set the reference distance based on whether the cursor is located within the figure during the entire reference time.

9. The device of claim 2,
    wherein the display comprises a non-active area, and
    wherein a touch event is not generated if the second touch coordinates are included in the non-active area.

10. The device of claim 1,
    wherein the movement information of the user device is obtained from a movement of a movement sensor, and
    wherein the at least one processor is further configured to transmit information regarding the movement of the movement member to a neighboring device.

11. A method of receiving a user input, the method comprising:
    obtaining, by a device comprising a display, movement information of a user device;
    displaying a cursor on the display in accordance with the movement information of the user device;
    determining first touch coordinates and generate a first touch event at the first touch coordinates;
    in response to the user device being moved by a user, obtaining the movement information of the user device, changing the first touch coordinates based on the movement information of the user device, and displaying the cursor based on the changed first touch coordinates;
    in response to the cursor moving beyond a reference distance from the first touch coordinates, determining coordinates to where the cursor is moved as dwell start coordinates; and
    in response to the cursor being located within the reference distance from the dwell start coordinates during an entire reference time starting from a point in time when the cursor is moved to the dwell start coordinates, determining the dwell start coordinates as second touch coordinates and generating a second touch event at the second touch coordinates.

12. The method of claim 11, wherein the method further comprises generating the second touch event at the second touch coordinates when the dwell start coordinates are determined as the second touch coordinates.

13. The method of claim 11, wherein the method further comprises re-determining, as the dwell start coordinates, coordinates of the cursor that are beyond the reference distance from the dwell start coordinates if the cursor is moved beyond the reference distance from the dwell start coordinates during the reference time.

14. The method of claim 11, wherein the method further comprises displaying the cursor on the display as the movement information of the user device is obtained.

15. The method of claim 11, wherein the method further comprises displaying an object on the display indicating an elapsed portion of the reference time.

16. The method of claim 11, wherein the method further comprises displaying a menu for selecting one of items in a predetermined region when the cursor is located on the predetermined region on the display.

17. The method of claim 11, wherein the method further comprises setting the reference distance based on the obtained movement information of the user device.

18. The method of claim 17, wherein the setting of the reference distance based on the movement information of the user device comprises:
   displaying a figure having a predetermined size on the display; and
   setting the reference distance based on whether the cursor is located within the figure during the entire reference time.

19. The method of claim 12, wherein the display comprises a non-active area wherein a touch event is not generated if the second touch coordinates are included in the non-active area.

20. The method of claim 11, further comprising:
   obtaining the movement information of the user device from a movement of a movement sensor; and
   transmitting information regarding the movement of the movement member to a neighboring device.

* * * * *